(12) United States Patent
Norbeck et al.

(10) Patent No.: US 7,208,530 B2
(45) Date of Patent: *Apr. 24, 2007

(54) PRODUCTION OF SYNTHETIC TRANSPORTATION FUELS FROM CARBONACEOUS MATERIAL USING SELF-SUSTAINED HYDRO-GASIFICATION

(75) Inventors: Joseph N. Norbeck, Riverside, CA (US); Colin E. Hackett, Riverside, CA (US); James E. Heumann, Newport Beach, CA (US); Uy Q. Ngo, El Cajon, CA (US); Nguyen T. Tran, Westminster, CA (US); Bilge Yilmaz, Somerville, MA (US)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/503,435

(22) PCT Filed: Feb. 4, 2003

(86) PCT No.: PCT/US03/03489

§ 371 (c)(1),
(2), (4) Date: Jun. 28, 2005

(87) PCT Pub. No.: WO03/066517

PCT Pub. Date: Aug. 14, 2003

(65) Prior Publication Data

US 2005/0256212 A1 Nov. 17, 2005

Related U.S. Application Data

(60) Provisional application No. 60/355,405, filed on Feb. 5, 2002.

(51) Int. Cl.
*C07C 27/00* (2006.01)
*C01B 31/18* (2006.01)
*C01B 3/24* (2006.01)
*C01B 3/32* (2006.01)

(52) U.S. Cl. ............ 518/704; 518/700; 518/702; 518/705; 518/706; 423/418.2; 423/650; 48/127.1; 48/127.5

(58) Field of Classification Search ........ 518/700–706; 423/418.2, 650; 48/127.1, 127.5
See application file for complete search history.

(56) References Cited

U.S. PATENT DOCUMENTS

| | | | | |
|---|---|---|---|---|
| 3,985,519 A | * | 10/1976 | Kalina et al. | 48/202 |
| 4,152,122 A | * | 5/1979 | Feldmann | 48/111 |
| 4,158,697 A | * | 6/1979 | Cramer | 422/189 |
| 4,678,860 A | * | 7/1987 | Kuester | 585/14 |
| 4,822,935 A | * | 4/1989 | Scott | 585/240 |

OTHER PUBLICATIONS

Olsen et al, Unit processes and Principles of Chemical Engineering, D. Van Nostrand Company, 1932, pp. 1-3.*

* cited by examiner

*Primary Examiner*—J. Parsa
(74) *Attorney, Agent, or Firm*—Berliner & Associates

(57) ABSTRACT

A process and apparatus for producing a synthesis gas for use as a gaseous fuel or as feed into a Fischer-Tropsch reactor to produce a liquid fuel in a substantially self-sustaining process. A slurry of particles of carbonaceous material in water, and hydrogen from an internal source, are fed into a hydro-gasification reactor under conditions whereby methane rich producer gases are generated and fed into a steam pyrolytic reformer under conditions whereby synthesis gas comprising hydrogen and carbon monoxide are generated. A portion of the hydrogen generated by the steam pyrolytic reformer is fed through a hydrogen purification filter into the hydro-gasification reactor, the hydrogen therefrom constituting the hydrogen from an internal source. The remaining synthesis gas generated by the steam pyrolytic reformer is either used as fuel for a gaseous fueled engine to produce electricity and/or process heat or is fed into a Fischer-Tropsch or similar reactor under conditions whereby a liquid fuel is produced.

19 Claims, 29 Drawing Sheets

PRODUCTION OF SYNTHETIC TRANSPORTATION FUELS FROM CARBONACEOUS MATERIAL USING SELF-SUSTAINED HYDRO-GASIFICATION

CROSS-REFERENCE TO RELATED APPLICATION

This application claims the benefit of Provisional Patent Application Ser. No. 60/355,405, filed Feb. 5, 2002.

STATEMENT REGARDING SPONSORED RESEARCH AND DEVELOPMENT

This invention was made with support from the City of Riverside. The City of Riverside has certain tights to this invention.

BACKGROUND OF THE INVENTION

1. Field of the Invention

The field of the invention is the synthesis of transportation fuel from carbonaceous feed stocks.

2. Description of Related Art

There is a need to identify new sources of chemical energy and methods for its conversion into alternative transportation fuels, driven by many concerns including environmental, health, safety issues, and the inevitable future scarcity of petroleum-based fuel supplies. The number of internal combustion engine fueled vehicles worldwide continues to grow, particularly in the midrange of developing countries. The worldwide vehicle population outside the U.S., which mainly uses diesel fuel, is growing faster than inside the U.S. This situation may change as more fuel-efficient vehicles, using hybrid and/or diesel engine technologies, are introduced to reduce both fuel consumption and overall emissions. Since the resources for the production of petroleum-based fuels are being depleted, dependency on petroleum will become a major problem unless non-petroleum alternative fuels, in particular clean-burning synthetic diesel fuels, are developed. Moreover, normal combustion of petroleum-based fuels in conventional engines can cause serious environmental pollution unless strict methods of exhaust emission control are used. A clean burning synthetic diesel fuel can help reduce the emissions from diesel engines.

The production of clean-burning transportation fuels requires either the reformulation of existing petroleum-based fuels or the discovery of new methods for power production or fuel synthesis from unused materials. There are many sources available, derived from either renewable organic or waste carbonaceous materials. Utilizing carbonaceous waste to produce synthetic fuels is an economically viable method since the input feed stock is already considered of little value, discarded as waste, and disposal is often polluting.

Liquid transportation fuels have inherent advantages over gaseous fuels, having higher energy densities than gaseous fuels at the same pressure and temperature. Liquid fuels can be stored at atmospheric or low pressures whereas to achieve liquid fuel energy densities, a gaseous fuel would have to be stored in a tank on a vehicle at high pressures that can be a safety concern in the case of leaks or sudden rupture. The distribution of liquid fuels is much easier than gaseous fuels, using simple pumps and pipelines. The liquid fueling infrastructure of the existing transportation sector ensures easy integration into the existing market of any production of clean-burning synthetic liquid transportation fuels.

The availability of clean-burning liquid transportation fuels is a national priority. Producing synthesis gases cleanly and efficiently from carbonaceous sources, that can be subjected to a Fischer-Tropsch process to produce clean and valuable synthetic gasoline and diesel fuels, will benefit both the transportation sector and the health of society. Such a process allows for the application of current state-of-art engine exhaust after-treatment methods for $NO_x$ reduction, removal of toxic particulates present in diesel engine exhaust, and the reduction of normal combustion product pollutants, currently accomplished by catalysts that are poisoned quickly by any sulfur present, as is the case in ordinary stocks of petroleum derived diesel fuel, reducing the catalyst efficiency. Typically, Fischer-Tropsch liquid fuels, produced from biomass derived synthesis gases, are sulfur-free, aromatic free, and in the case of synthetic diesel fuel have an ultrahigh cetane value.

Biomass material is the most commonly processed carbonaceous waste feed stock used to produce renewable fuels. Waste plastic, rubber, manure, crop residues, forestry, tree and grass cuttings and biosolids from waster water (sewage) treatment are also candidate feed stocks for conversion processes. Biomass feed stocks can be converted to produce electricity, heat, valuable chemicals or fuels. California tops the nation in the use and development of several biomass utilization technologies. Each year in California, more than 45 million tons of municipal solid waste is discarded for treatment by waste management facilities. Approximately half this waste ends up in landfills. For example, in just the Riverside County, California area, it is estimated that about 4000 tons of waste wood are disposed of per day. According to other estimates, over 100,000 tons of biomass per day are dumped into landfills in the Riverside County collection area. This municipal waste comprises about 30% waste paper or cardboard, 40% organic (green and food) waste, and 30% combinations of wood, paper, plastic and metal waste. The carbonaceous components of this waste material have chemical energy that could be used to reduce the need for other energy sources if it can be converted into a clean-burning fuel. These waste sources of carbonaceous material are not the only sources available. While many existing carbonaceous waste materials, such as paper, can be sorted, reused and recycled, for other materials, the waste producer would not need to pay a tipping fee, if the waste were to be delivered directly to a conversion facility. A tipping fee, presently at $30–$35 per ton, is usually charged by the waste management agency to offset disposal costs. Consequently not only can disposal costs be reduced by transporting the waste to a waste-to-synthetic fuels processing plant, but additional waste would be made available because of the lowered cost of disposal.

The burning of wood in a wood stove is an example of using biomass to produce heat energy. Unfortunately, the open burning the biomass waste to obtain energy and heat is not a clean and efficient method to utilize the calorific value. Today, many new ways of utilizing carbonaceous waste are being discovered. For example, one way is to produce synthetic liquid transportation fuels, and another way is to produce energetic gases for conversion into electricity.

Using fuels from renewable biomass sources can actually decrease the net accumulation of greenhouse gases, such as carbon dioxide, while providing clean, efficient energy for transportation. One of the principal benefits of co-production of synthetic liquid fuels from biomass sources is that it can provide a storable transportation fuel while reducing the effects of greenhouse gases contributing to global warming. In the future, these co-production processes could provide clean-burning fuels for a renewable fuel economy that could be sustained continuously.

A number of processes exist to convert coal and other carbonaceous materials to clean-burning transportation fuels, but they tend to be too expensive to compete on the market with petroleum-based fuels, or they produce volatile fuels, such as methanol and ethanol that have vapor pressure values too high for use in high pollution areas, such as the Southern California air-basin, without legislative exemption from clean air regulations. An example of the latter process is the Hynol Methanol Process, which uses hydro-gasification and steam reformer reactors to synthesize methanol using a co-feed of solid carbonaceous materials and natural gas, and which has a demonstrated carbon conversion efficiency of >85% in bench-scale demonstrations.

The need to identify new resources and methods for the production of transportation fuels requires not only investigating improvements in ways to produce current petroleum-based fuels but also research into new methods for the synthesis of functionally equivalent alternative fuels obtained using resources and methods that are not in use today. The production of synthetic liquid fuels from carbonaceous materials such as waste organic materials is one way to solve these problems. The utilization of carbonaceous waste materials to produce synthetic fuels can be considered a feasible method of obtaining new resources for fuel production since the material feed stock is already considered a waste without value and often it's disposal creates additional sources of environmental pollution.

SUMMARY OF THE INVENTION

The present invention makes use of steam pyrolysis, hydro-gasification and steam reformer reactors to produce a synthesis gas that can be converted into a synthetic paraffinic fuel, preferably a diesel fuel, although synthetic gasolines and jet propulsion fuels can also be made, using a Fischer-Tropsch paraffin fuel synthesis reactor. Alternatively, the synthesis gas may be used in a co-generated power conversion and process heat system. The present invention provides comprehensive equilibrium thermo-chemical analyses for a general class of co-production processes for the synthesis of clean-burning liquid transportation fuels, thermal process energy and electric power generation from feeds of coal, or other carbonaceous materials, and liquid water. It enables a unique design, efficiency of operation and comprehensive analysis of coal, or any other carbonaceous feed materials to co-produced fuel, power and heat systems.

The invention provides a process and apparatus for producing a synthesis gas for use as a gaseous fuel or as feed into a Fischer-Tropsch reactor to produce a liquid paraffinic fuel, recycled water and sensible heat, in a substantially self-sustaining process. A slurry of particles of carbonaceous material suspended in liquid water, and hydrogen from an internal source, are fed into a steam generator for pyrolysis and hydro-gasification reactor under conditions whereby super-heated steam, methane, carbon dioxide and carbon monoxide are generated and fed into a steam reformer under conditions whereby synthesis gas comprising primarily of hydrogen and carbon monoxide are generated. Using a hydrogen separation filter for purification, a portion of the hydrogen generated by the steam reformer is fed into the hydro-gasification reactor as the hydrogen from an internal source. The remaining synthesis gas generated by the steam reformer is either used as fuel for a gaseous fueled engine or gas turbine to produce electricity and process heat, or is fed into a Fischer-Tropsch fuel synthesis reactor under conditions to produce a liquid fuel, and recycled water. The correct stoichiometric ratio of hydrogen to carbon monoxide molecules fed into the Fischer-Tropsch fuel synthesis reactor, is controlled by the water to carbon ratio in the feed stocks. Molten salt loops are used to transfer heat from the exothermic hydro-gasification reactor (and from the exothermic Fischer-Tropsch reactor if liquid fuel is produced) to the endothermic steam generator for pyrolysis and the steam reformer reactor vessels.

In particular, the present invention provides the following features.

1) A general purpose solid carbonaceous material feed system that can accept arbitrary combinations of coal, urban and agricultural biomass, and municipal solid waste for hydro-gasification.

2) A first stage, steam generator for pyrolysis and hydro-gasification unit.

3) A steam reformer as a second stage reactor to produce hydrogen rich synthesis gas from the output of the first stage steam generator for pyrolysis and hydro-gasification unit. The molal steam to carbon ratio is maintained as necessary to bring the chemical reactions close to equilibrium;

4) Either (a) a Fischer-Tropsch (synthesis gas-to-liquid) fuel synthesizer as a third and final stage reactor to convert the synthesis gas from the steam reformer into a sulfur-free clean-burning liquid transportation fuel, and recycled water or (b) use of generated synthesis gas as fuel for process heat and/or in a fuel engine or gas turbine that can generate electricity;

5) Three thermo-chemical process reactors are operated to produce nearly pure paraffinic hydrocarbon liquids (similar to petroleum derived diesel fuels) and wax-like compounds (similar to petroleum derived USP paraffinic jellies, which can be further refined into more diesel-like fuels using conventional methods) from carbonaceous feed stocks (such as waste wood) in a continuous self-sustainable fashion without the need for additional fuels or external energy sources. The reactor configurations can also be optimized for the production of other synthetic fuels, such as dimethyl ether (a fuel similar to propane, that can be used as a transportation fuel in diesel engines and gas turbines) and gaseous fuel grade hydrogen (a fuel that can be used in engines and turbines, and if purified to remove carbon monoxide, as an electrochemical fuel in a fuel cell), as well as energetic synthesis gases for combined cycle power conversion and electric power production.

The fundamental advantages of this invention, over what was achievable with the prior art, are: (a) energy efficient (>85%) methane production from the available carbon in the carbonaceous feed stock using steam pyrolysis to activate the carbon and hydrogen gas as the sole initiating reactant, in contradistinction to partial oxidative gasification usually requiring an additional energy intensive air separation system to provide the necessary oxygen; (b) chemically self-sustained operation of the first stage hydro-gasification reactor by feeding-back surplus hydrogen gas produced in the second stage methane steam reformer reactor; (c) energy efficient synthesis of clean-burning transportation fuels using the effluent gases from the steam reformer, such as: (i) paraffinic compounds using a third stage Fischer-Tropsch fuel synthesis reactor, (ii) dimethyl ether synthesis using a third stage synthesis reactor, and (iii) hydrogen production using a hydrogen separation and/or purification filter without the need for a third stage fuel synthesis reactor; (d) thermally self-sustained operation of all reactors by effective management of thermal and chemical energy using combinations of molten salt or water/steam heat transfer fluids, combustion of product energetic gases to start and maintain process temperatures, recovered process heat for the generation of electric power, without the need for additional fuels and external energy sources; (e) significantly reduced airborne emissions from all enclosed processes reactors and/or synthesis gas combustors when compared to direct naturally aspirated combustion (usually known as open incineration) of the carbonaceous feed materials; and f) the ability to capture all gaseous carbon dioxide effluent from process reactors or intra-process synthesis gas combustors for sequestration and/or chemical conversion into condensed phase compounds using conventional technologies.

These novel configurations of the process reactors have the capability to improve the overall efficiency of energy utilization for carbonaceous material conversion in a co-production plant for synthetic fuels, chemicals and energy.

DETAILED DESCRIPTION OF THE INVENTION

Figure 1:
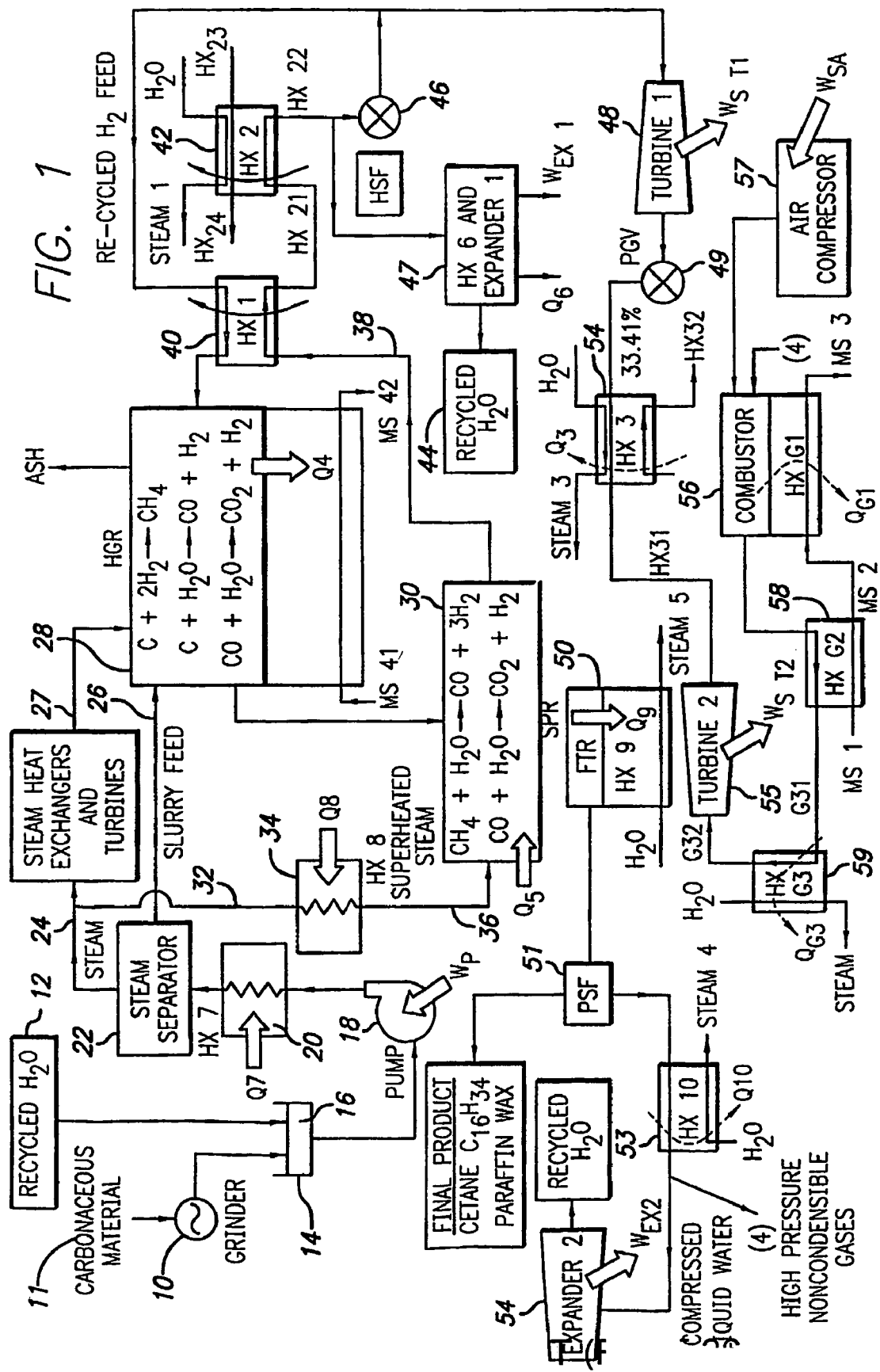
FIG. 1 is a flow diagram showing the overall modeling of the present invention.

A steam generator for pyrolysis, hydro-gasification reactor (HGR) and steam pyrolytic reformer (SPR) (also called a steam pyrolytic reactor, steam reformer or steam reactor) such as used in a Hynol process, may be utilized to produce the synthesis gas (syngas) through steam pyrolysis of the feed stock, hydro-gasification and steam reforming reactions. The reactions start in the HGR to convert carbon in the carbonaceous matter into a methane rich producer gas and continue through the SPR to produce synthesis gas with the correct hydrogen and carbon monoxide stiochiometry for efficient operation of the Fischer-Tropsch process. With the Fischer-Tropsch process as the final step in processing, products such as synthetic gasoline, synthetic diesel fuel and recycled water can be produced.

The feedstock requirement is highly flexible. Many feeds that consist of different carbonaceous materials can be wet milled to form a water slurry that can be fed at high pressure into a steam pyrolyzer, hydro-gasifier and steam reformer reactors for synthesis gas production. The feed to water mass ratio can even vary during the running of the process, with a knowledge of the chemical content of the feed, to maintain the carbon-hydrogen stiochiometry required for an optimized fuel synthesis process. Appropriate carbonaceous materials include biomass, natural gas, oil, petroleum coke, coal, petrochemical and refinery by-products and wastes, plastics, tires, sewage sludge and other organic wastes. For example, wood is an example of waste biomass material that is readily available in Riverside County, California. This particular waste stream could be augmented with other carbonaceous materials, such as green waste and biosolids from water treatment that are available in Riverside County, and would otherwise go to landfill.

When used to make a transportation fuel, such as diesel fuel, the process is designed so that the feedstock makes the maximum amount of Fischer-Tropsch paraffinic product required. The desired output consists of a liquid hydrocarbon, such as cetane, $C_{16}H_{34}$, within the carbon number range, 12 to 20, suitable as a diesel fuel. Excess synthesis gas output from the SPR, i.e., "leftover" chemical energy from the Fischer Tropsch synthetic fuel producing process, can be used as an energetic fuel to run a gas turbine for electricity production. The synthesis gas output after recycling enough hydrogen to sustain the hydro-gasifier, may be used for this purpose also, depending on the needs of the user. The following provides a method for maximizing the economic potential from the present invention in the conversion of carbonaceous materials to a usable transportation fuels and inclusive of the possibility for direct electric power production through a gas turbine combined cycle.

1) Find approximate data on available carbonaceous wastes, their chemical composition and perform further analysis on the practical need for the process.

2) Model the important reactions within the process consisting of the steam generator for pyrolysis, hydro-gasifier, steam reformer, and the Fischer-Tropsch (or other fuel synthesis) reactor on a continuous flow-through basis. This may be done by optimizing the Fischer-Tropsch (or other fuel synthesizer) feedstock for the optimum stoichiometric hydrogen to carbon monoxide mole ratio for fuel to be synthesized.

3) Perform an economic analysis on the costs to obtain and prepare the input material required, capital costs, operating and maintenance, and product yield and costs.

Specific implementations are given below in conjunction with flow charts provided in the Figures, demonstrating the conversion of waste wood, as the candidate carbonaceous material, to a liquid diesel transportation fuel, recycled water and an alternative power source, via a Fischer-Tropsch process linked to a gas turbine combined cycle.

The thermo-chemical conversion of carbonaceous materials occurs by two main processes: hydro-gasification and steam reformation, with steam pyrolysis of the feedstock occurring within the steam generator to pre-treat feedstock and activate the carbon contained therein. The hydro-gasifier requires an input of the pyrolyzed carbonaceous waste, hydrogen, steam, reacting in a vessel at high temperature and pressure, which in a specific implementation is approximately 30 atmospheres and 1000 degrees Celsius. Steam reforming of the methane rich effluent gas from the HGR also requires an approximate pressure of 30 atmospheres and 1000 degrees Celsius. More generally, each process can be conducted over a temperature range of about 700 to 1200 degrees Celsius and a pressure of about 20 to 50 atmospheres. Lower temperatures and pressures can produce useful reaction rates with the use of appropriate reaction catalysts.

Referring to FIG. 1, which is an overall flow diagram, the order of general processes that carry out these main reaction processes is shown (specific amounts for a particular embodiment are in the flow diagrams shown in FIGS. 14 through 38). Piping is used to convey the materials through the process. The feed 11 is chopped, milled or ground in a grinder 10 into small particles, mixed with the recycled water 12 and placed in a receptacle or tank 14 as a liquid, suspension slurry 16 that is transportable as a compressed fluid by a pump 18 to a steam generator 20 where the slurry 16 is superheated and pyrolyzed, followed by either separation of the steam in a steam separator 22 so that steam goes through piping 24 that is separate from piping that delivers the pumped, dense slurry paste 26, or a direct steam pyrolysis feed through piping 27.

The dense slurry paste feed 26, or the direct steam pyrolysis feed 27, enters the HGR 28. Hydrogen from an internal source (from the steam reformer via a hydrogen separation filter described below) and a fraction of the previously produced steam flow into the HGR 28 for the desired output. The output gases consists largely of methane, hydrogen, carbon monoxide, and super-heated steam. The gases produced by the HGR 28 leaves the chamber and is pumped over to the SPR 30. The un-reacted residue (or ash) from the HGR, is periodically removed from the bottom of the reactor vessel using a double buffered lock-hopper arrangement, that is commonly used in comparable high pressure gasification systems. The ash is expected to be comprised of sand, $SiO_2$, and alumina, $Al_2O_3$, with trace amounts of metals. The input to the SPR 30 is delivered from either the steam separator 22 by piping 32 through a heater 34 and further piping 36, or via the HGR 28 output piping, to provide greater-than-theoretical steam to carbon ratio into the SPR 30, to mitigate coking in the reactor. The output is a higher amount of hydrogen, and CO, with the appropriate stiochiometry for the desired hydrocarbon fuel synthesis process described below.

The output of the SPR 30 is directed via piping 38 through heat exchangers 40 and 42. Condensed water 44 is separated and removed from the SPR output, via a heat exchanger and liquid water expander 47. The non-condensable gaseous output of SPR 30 is then conveyed to a hydrogen separation filter 46. A portion of the hydrogen from the SPR output, about one-half in this embodiment, is carried from the filter 46, passed through the heat exchanger 40 with a resultant rise in its temperature (in the embodiment from 220 degrees centigrade to 970 degrees Centigrade) and delivered to the HGR 28 as its hydrogen input. The hot effluent from the SPR output is cooled by passing through heat exchangers 40 and 42, used to heat the recycled hydrogen, and make steam respectively. The condensed water 44 leaving the heat exchanger 47 is recycled back to make the water supply 12 for the slurry feed. By such means, a self-sustaining process is obtained.

The fuel synthesis gas is then used for one of two options. Based on the calorific value, the synthesis gas may go through a gas turbine combined cycle for direct energy production or through a fuel synthesis reactor (in this embodiment, a Fischer-Tropsch process to produce a clean diesel fuel and recycled water). In accordance with a specific embodiment of the invention, the synthesis gas is directed through an expansion turbine 48, to recover mechanical energy by lowering the pressure of the gaseous feed into the Fischer-Tropsch reactor 50. The mechanical power produced by the liquid state turbine, the Brayton and Rankine cycle turbines can be used to provide power for internal slurry, water feed pumps, air compressor, with the surplus exported via electricity generation, see Tables 1 through 7.

Efficiency may be maximized by adjusting input and process parameters. The biomass/coal varying-mixture feed is synthesized into a slurry by adding water whereby after steam separation the carbon to hydrogen ratio will be appropriate for the process. A slurry feed needs enough water to run the hydro-gasifier, the steam reformer, and to keep the feed in a viable slurry after steam separation. Prior art attempts at biomass conversion using solid dry feed had many mechanical problems of feeding a solid into the high pressure, and high temperature HGR reaction chamber. This method of slurry feed has already been demonstrated and studied, according to the results for the "Hydrothermal Treatment of Municipal Solid Waste to Form High Solids Slurries in a Pilot Scale System", by C. B. Thorsness et al., UCRL-ID 119685, published by Lawrence Livermore Nation Laboratory, Livermore, Calif. in 1995. In addition, there is related art published on the making and operating of coal water slurry feeds. For example, see Z. Aktas et al., Fuel Processing Technology 62 2000 1–15. The principle reactions of the two main processes, hydro-gasification and steam reforming, are shown here. The HGR independent reactions can be expressed as:

$$C + 2H_2 \rightarrow CH_4 \quad (1)$$

$$C + 2H_2O \rightarrow CO + H_2 \quad (2)$$

$$CO_2 + H_2 \rightarrow CO + H_2O \quad (3)$$

Reactions 2 and 3 are endothermic. Reaction 1 is sufficiently exothermic to provide the heat of reaction for reactions 2 and 3. Some preheating of the HGR will be needed to bring the reactor up to its operating temperature. Thus, the HGR is intended to be self-sustaining once the reactions have started and achieve steady state.

The main purpose of the HGR process is to maximize the carbon conversion from the feed stock into the energetic gases $CH_4$ and CO. After this process, hydrogen is produced by reacting superheated steam with $CH_4$ and CO within the SPR. In the SPR, half the hydrogen is obtained from the superheated steam and the remainder from the $CH_4$. The principle reactions in the SPR are considered to be:

$$CH_4 + H_2O \rightarrow CO + 3H_2 \quad (4)$$

$$CO_2 + H_2 \rightarrow CO + H_2O \rightarrow CO_2 + H_2 \quad (5)$$

The steam reforming reactions (4 and 5) are often run with steam concentrations higher than required for the stochiometry shown above. This is done to avoid coke formation and to improve conversion efficiency. The required steam concentration is usually specified in the form of the steam-to-carbon mole ratio (S:C), the ratio of water steam molecules per carbon atom in the HGR feed. The preferred (S:C) ratio for the SPR operation is greater than 3. This steam rich condition favors the water-gas shift reaction. This reaction is only slightly exothermic ($\Delta H° = -41$ kJ/mole CO); however, it produces additional hydrogen gas and converts carbon monoxide into carbon dioxide. Unfortunately, an additional unwanted secondary reaction can occur, the methanation reaction, which consumes hydrogen:

$$CO + 3H_2 \rightarrow CH_4 + H_2O \quad (6)$$

The resulting effluent after the two main reactors is a synthesis of gases rich in hydrogen, carbon monoxide, and steam. Approximately half the hydrogen produced in the SPR is recycled back to the HGR. Consequently, no outside source of hydrogen is needed to maintain steady state operation. The HGR and SPR processes, therefore, may be considered to be chemically self-sustaining. The remaining synthesis gas is then available for the production of fuels and process heat.

The present invention using the Fischer-Tropsch process can produce a zero-sulfur, ultrahigh cetane value diesel-like fuel and valuable paraffin wax products. The absence of sulfur enables low pollutant and particle emitting diesel fuels to be realized.

The present invention also provides a source of by-products. One useful by-product is purified water, which can be re-cycled to create the slurry feed into the process. In a report by Rentech titled "Fischer-Tropsch technology" dated 1998 see Rentech web publications at http://www.rentechinc.com. Rentech states that the Fischer-Tropsch process with an iron catalyst makes about 7/10ths of a barrel of water per barrel of Fischer-Tropsch products. A cobalt catalyzed Fischer-Tropsch process makes about 1.1 to 1.3 barrels of water for each barrel of Fischer-Tropsch products, a greater amount than iron. Part of the water may be recycled to make steam in the steam reformer unit and for cooling in both the synthesis gas and Fischer-Tropsch step of the overall process.

The Fischer-Tropsch reactions also produce tail gas that contains hydrogen, CO, $CO_2$, and some light hydrocarbon gases. Hydrogen can be stripped out of the tail gas and recycled either to the HGR or the Fischer-Tropsch reactor. Any small amounts of other gases such as CO and $CO_2$ may be flared off.

Two main products of Fischer-Tropsch may be characterized as synthetic oil and petroleum wax. According to Rentech, in the above report for their particular implementation of the Fischer-Tropsch process, the mix of solid wax to liquid ratio is about 50/50. Fischer-Tropsch products are totally free of sulfur, nitrogen, nickel, vanadium, asphaltenes, and aromatics that are typically found in crude oil. The products are almost exclusively paraffins and olefins with very few, or no, complex cyclic hydrocarbons or oxygenates that would otherwise require further separation and/or processing in order to be usable end-products. The absence of sulfur, nitrogen, and aromatics substantially reduces harmful emissions.

California's Air Resources Board (CARB) specifications for diesel fuel require a minimum cetane value of 48 and reduced sulfur content. The above Rentech study with Shell diesel fuel produced from a Fischer-Tropsch process has a cetane value of 76. The CARB standard for sulfur in diesel fuel placed in the vehicle tank is 500 ppm by weight, and Shell's Fischer-Tropsch process diesel fuel has no detectable amount in the ppm range. The CARB standard for aromatic content is no more than 10% by volume (20% for small refineries). The Shell Fischer-Tropsch process diesel fuel had no detectable aromatics.

Rentech further affirmed through studies that the diesel fuel may need no further processing because of the purity and olefin products that may even be advantageous over crude oil diesel. The Fischer-Tropsch diesel process is clean and the product is cleaner, has a higher cetane value, and most likely does not need further processing, when compared to a crude oil diesel.

A gas turbine combined cycle for electric power production is an option. If the Fischer-Tropsch product is unexpectedly too costly, the use of the synthesis gas heating value can be a viable option, based on an overall efficiency of 65% of the synthesis gas energy converting to electric energy. This number is reasonable since the synthesis gas starts at a high temperature as opposed to taking natural gas in from a pipeline.

Process modeling can be used to reasonably produce a synthesis gas maximized for a yield high in CO and stoichiometric hydrogen. First, the unit operation reactions of the hydro-gasifier, steam reformer, and Fischer-Tropsch reactors are modeled. This may be accomplished by using Stanjan, a DOS-based computer program that uses equilibrium modeling. By varying the parameters of temperature, pressure, original feedstock and gas flows, a parameterization study was carried out based on costs and output benefit. The hydro-gasifier variables were modified for the maximum practical carbon conversion efficiency. The steam reformer variables were modified for maximum practical CO output, enough hydrogen for recycling output, and minimum $CO_2$ production. The study looked at the various parameters whereby two different values varied for one constant, resulting in 3-D parameterization studies. The following discusses the results from the computer modeling of the main reactions using Stanjan programming.

Figure 2:
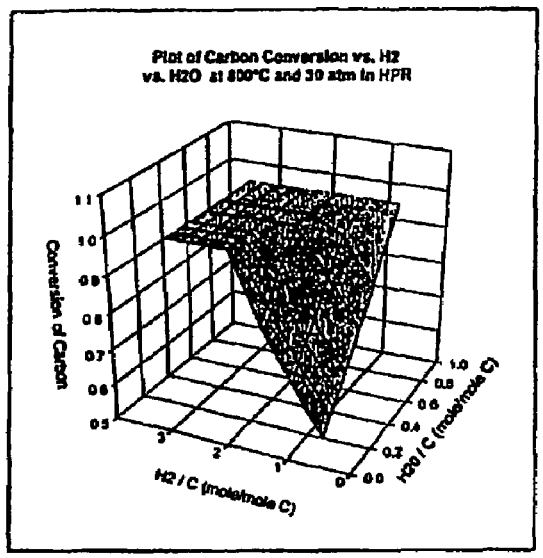
FIG. 2 is a graph showing a plot of carbon conversion vs. $H_2/C$ and $H_2O/C$ ratios at 800° C. and 30 atm. in HPR.
Figure 3:
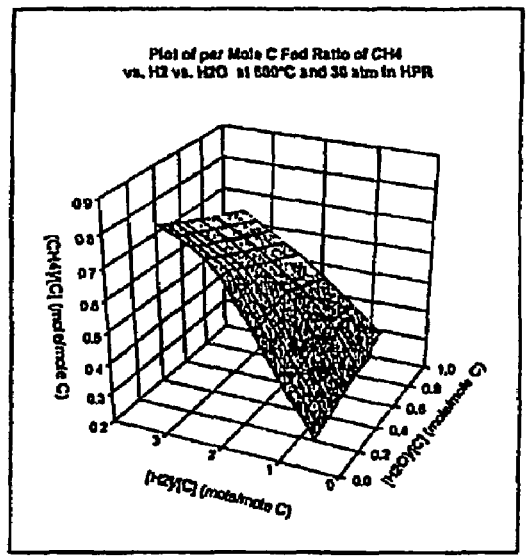
FIG. 3 is a graph showing a plot of $CH_4/C$ feed ratio vs. $H_2/C$ and $H_2O/C$ ratios at 800° C. and 30 atm. in HPR.
Figure 4:
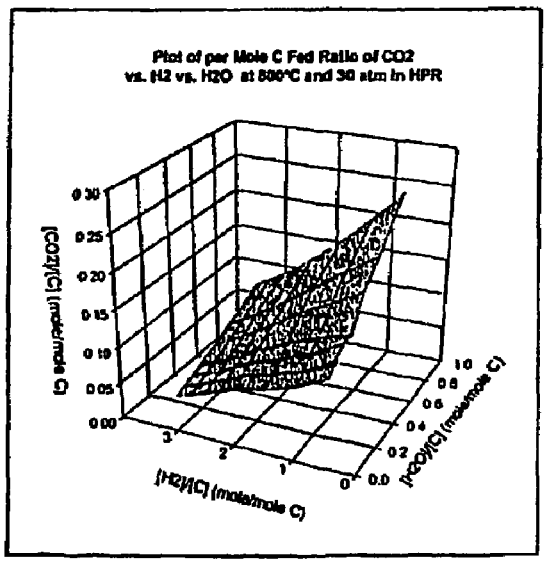
FIG. 4 is a graph showing a plot of $CO_2/C$ feed ratio vs. $H_2/C$ and $H_2O/C$ ratio sat 800° C. and 30 atm. in HPR.
Figure 5:
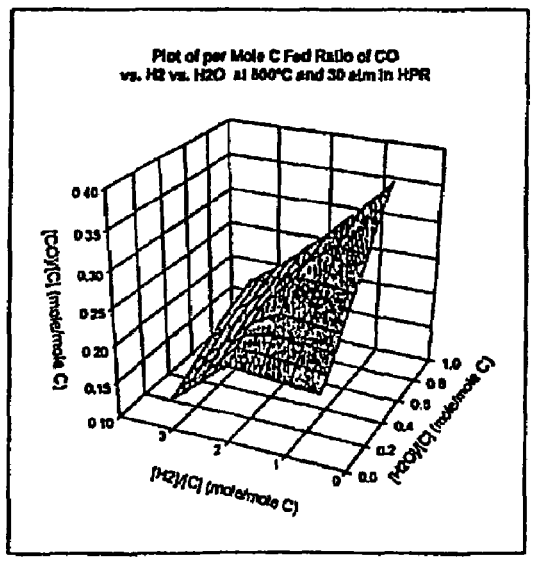
FIG. 5 is a graph showing a plot of CO/C feed ratio vs. $H_2/C$ and $H_2O/C$ ratios at 800° C. and 30 atm. in HPR.
Figure 6:
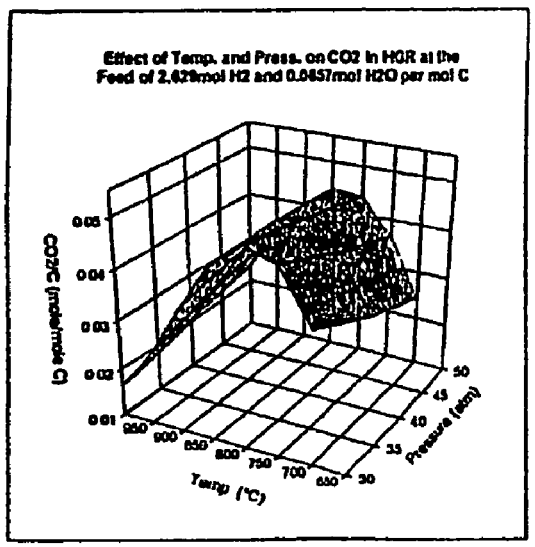
FIG. 6 is a graph showing the effects of Temperature and Pressure conditions on $CO_2/H$ ration the hydro-gasifier reactor (HGR) at fixed feed of 2.629 moles of $H_2$ and 0.0657 moles of $H_2O$ per mole of C.
Figure 7:
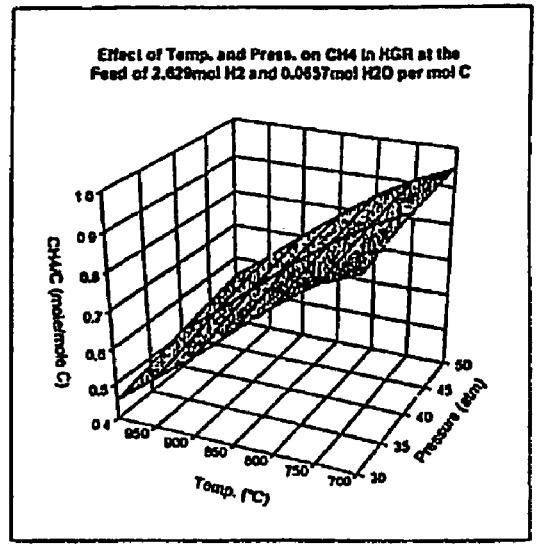
FIG. 7 is a graph showing the effect of Temperature and Pressure conditions on $CH_4/H$ ratio in the HGR at fixed feed of 2.629 moles of $H_2$ and 0.0657 moles of $H_2O$ per mole of C.
Figure 8:
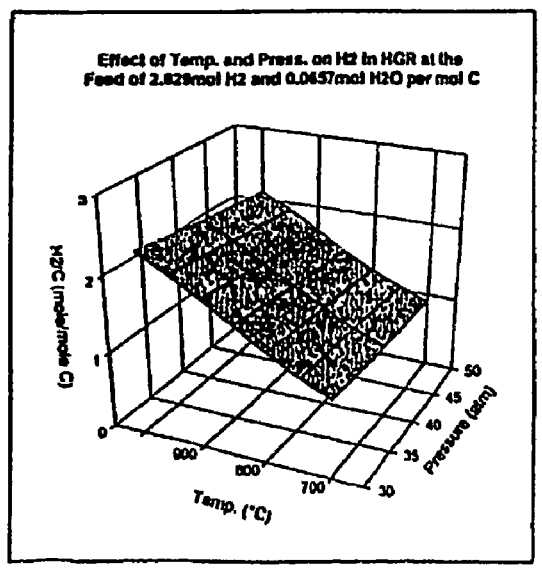
FIG. 8 is a graph showing the effect of Temperature and Pressure conditions on $H_2/C$ ratio in the HGR at fixed feed of 2.629 moles of $H_2$ and 0.0657 moles of $H_2O$ per mole of C.
Figure 9:
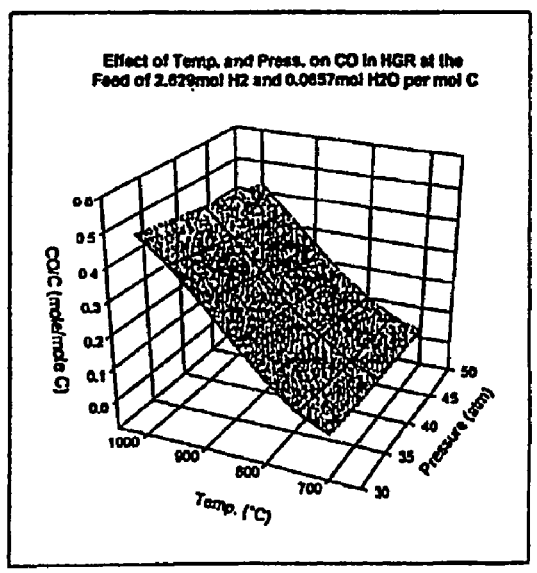
FIG. 9 is a graph showing the effect of Temperature and Pressure conditions on CO/H in the HGR at fixed feed of 2.629 moles of $H_2$ and 0.0657 moles of $H_2O$ per mole of C.

Referring to FIG. 2, the effect of varying the water or steam and hydrogen ratios on the conversion efficiency of carbon in feedstock in the HGR is shown at 800° C. and 30 atm. As the hydrogen and water input to the HGR increases, the conversion efficiency of carbon in feedstock increases until it reaches 100%. The condition that falls in the area of 100% conversion efficiency achieves one of the modeling objectives, and these conditions were used. In order to avoid the cost of recycling of $H_2$, the minimum amount of $H_2$ recycled to the HGR must be chosen. FIG. 3 shows the effect of $H_2$ and $H_2O$ on $CH_4$ in the HGR at 800° C. and 30 atm. FIG. 4 shows the effect of $H_2$ and $H_2O$ on $CO_2$ in the HGR at 800° C. and 30 atm. At a high amount of $H_2$ and low amount of $H_2O$ input, the amount of $CO_2$ is low. Although the objective is to minimize the amount of $CO_2$ in the synthesis gas, it is not necessary to minimize $CO_2$ in the HGR because $CO_2$ is gauged in the SPR reactions through the water-gas-shift reaction to obtain a proper ratio of $H_2$ and CO for a maximum Fischer-Tropsch diesel fraction. FIG. 5 shows the effect of $H_2$ and $H_2O$ on CO in the HGR at 800° C. and 30 atm.

FIGS. 6, 7, 8 and 9 show the effects of varying temperature and pressure on the chemical composition of the effluent gases from the HGR at feed of 2.76 mol $H_2$ and 0.066 mol $H_2O$ per mole C in the feed stock. At these conditions of $H_2$ and $H_2O$ input to the HGR, the carbon conversion efficiency is estimated to close to 100% in a temperature range of 800 to 1000° C. and a pressure range of 30 atm. to 50 atm, for equilibrium chemistry.

Figure 10:
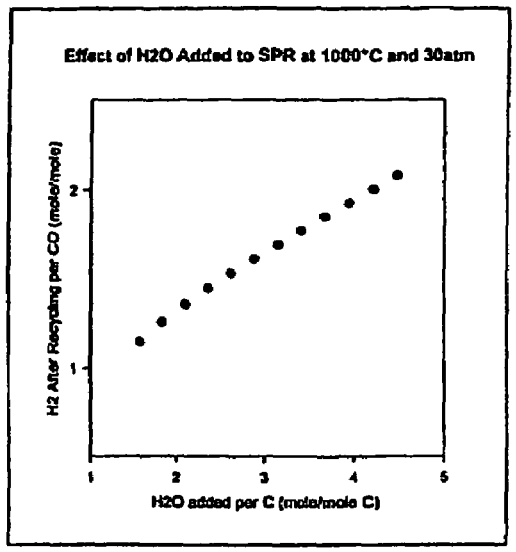
FIG. 10 is a graph showing the effect of input $H_2O/C$ ratio on steam reformer (SPR) performance measure by the net $H_2/CO$ ratio after H2 recycling for the HGR at 1000° C. and 30 atm.
Figure 11:
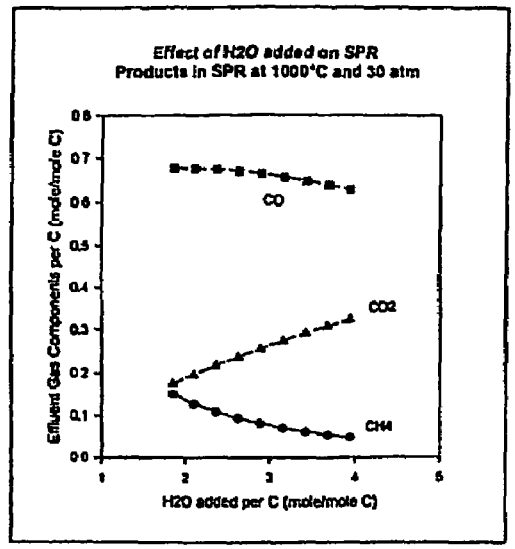
FIG. 11 is a graph showing the effect of changing the input $H_2O/C$ ratio on SPR products, CO, $CO_2$ and $CH_4$ in the SPR at 1000° C. and 30 atm.
Figure 12:
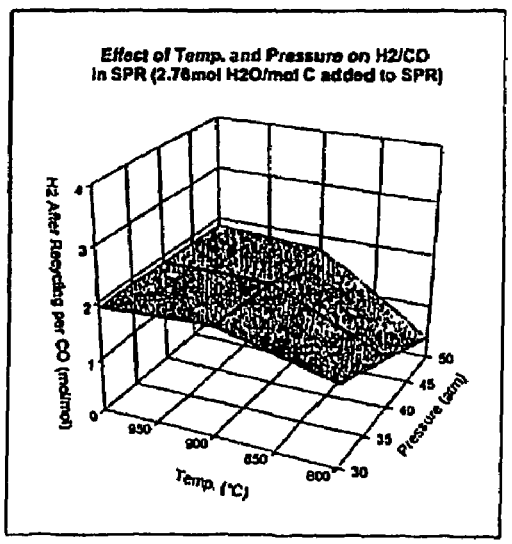
FIG. 12 is a graph showing the effect of Temperature and Pressure conditions on $H_2/CO$ ratio in the SPR (2.76 moles of $H_2O$/mole of C added to the SPR)
Figure 13:
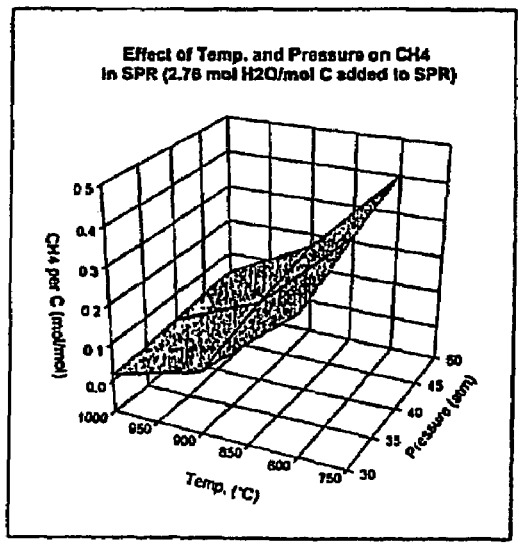
FIG. 13 is a graph showing the effect of Temperature and Pressure conditions on $CH_4/C$ ratio in the SPR (2.76 moles of $H_2O$/mole of C added to the SPR)
Figure 14:
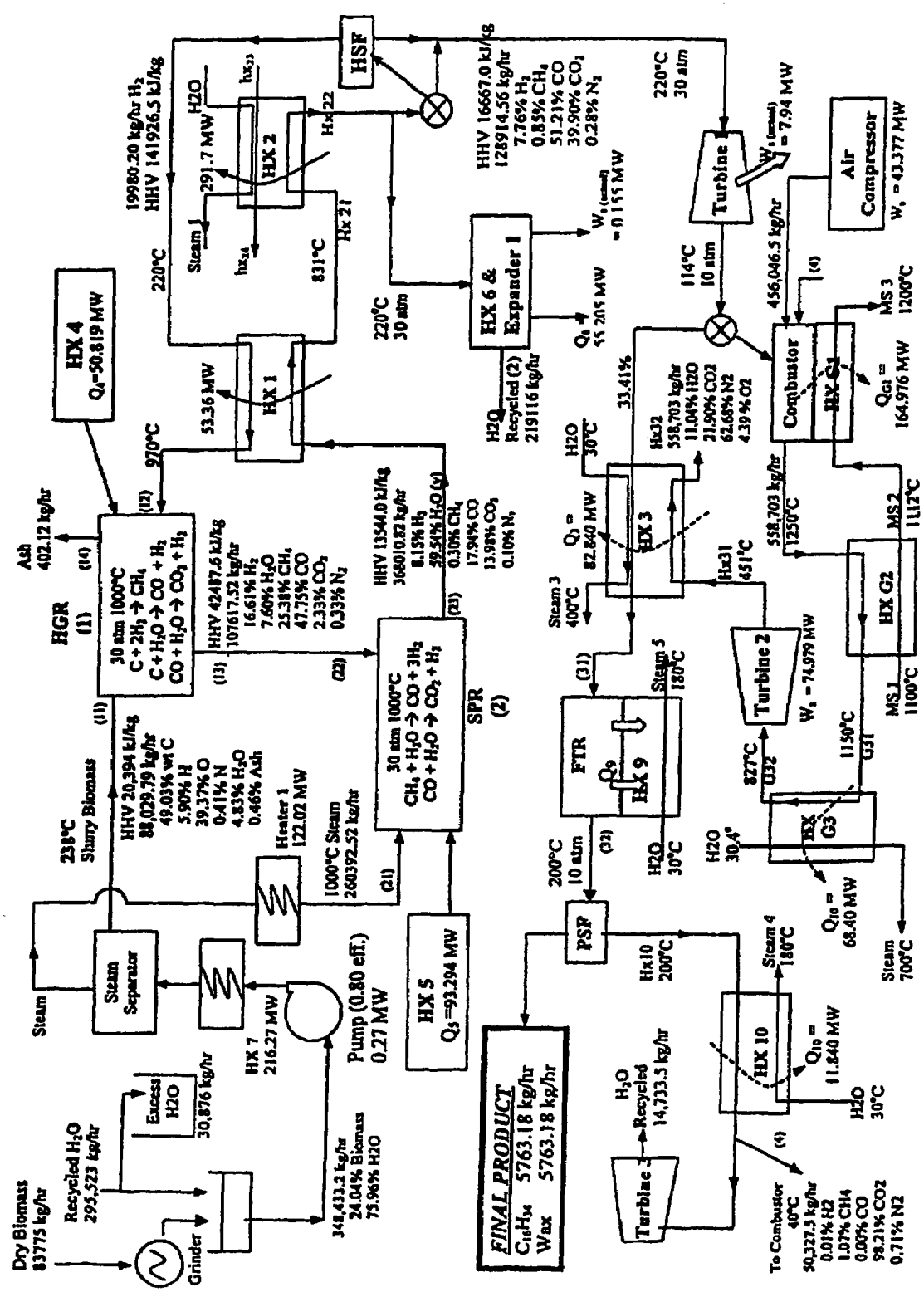
FIG. 14 is a diagram showing the Mass Flow Schematic of Biomass Hydro-gasification for production of Fischer-Tropsch paraffin fuels.
Figure 15:
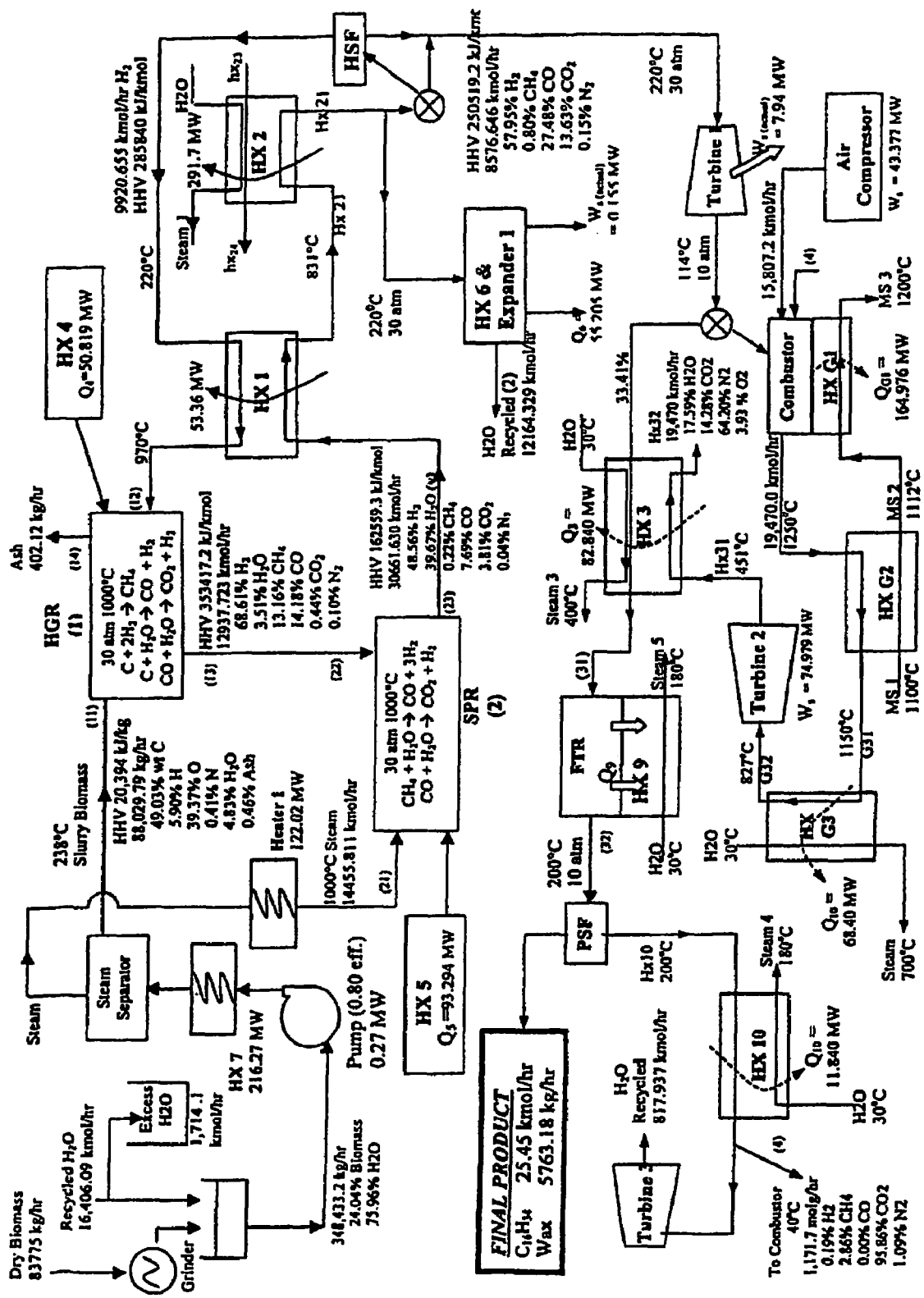
FIG. 15 is a diagram showing the Molal Flow Schematic of Biomass Hydro-gasification for production of Fischer-Tropsch paraffin fuels.
Figure 16:
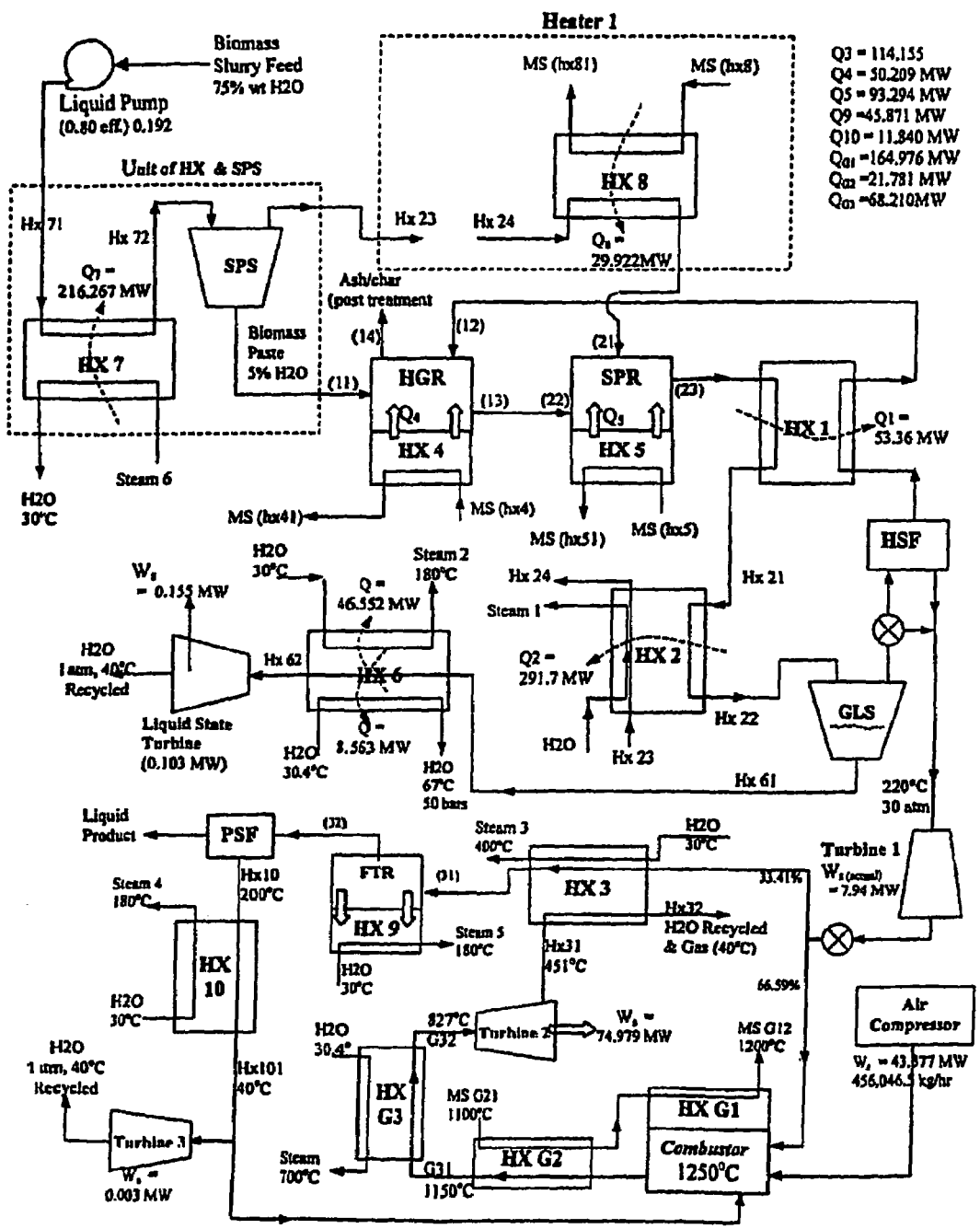
FIG. 16 is a diagram showing the Thermal Energy Management Schematic of Biomass Hydro-gasification for production of Fischer-Tropsch paraffin fuels.
Figure 17:
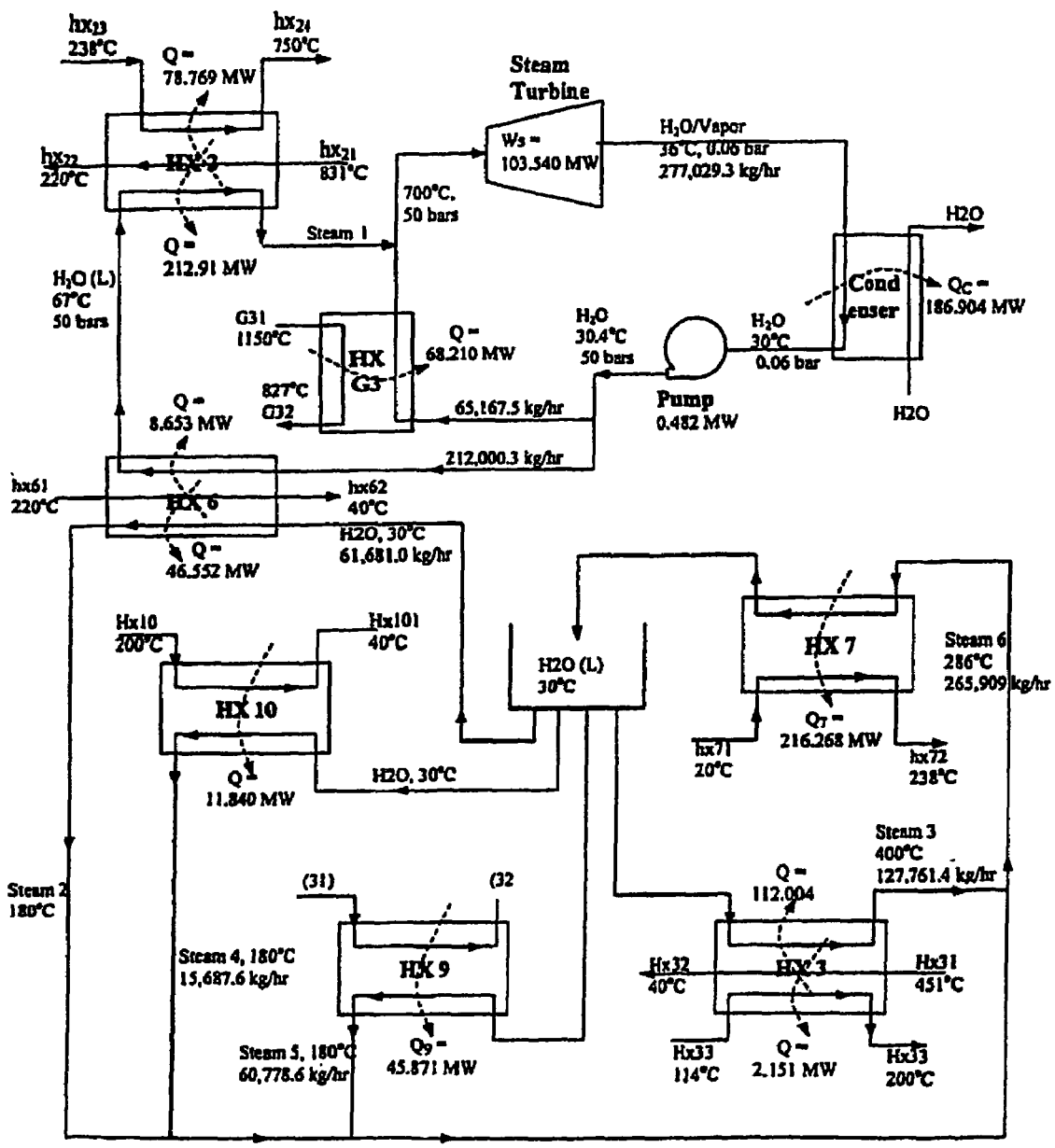
FIG. 17 is a diagram showing the Water/Steam Flow Schematic of Biomass Hydro-gasification for production of Fischer-Tropsch paraffin fuels.
Figure 18:
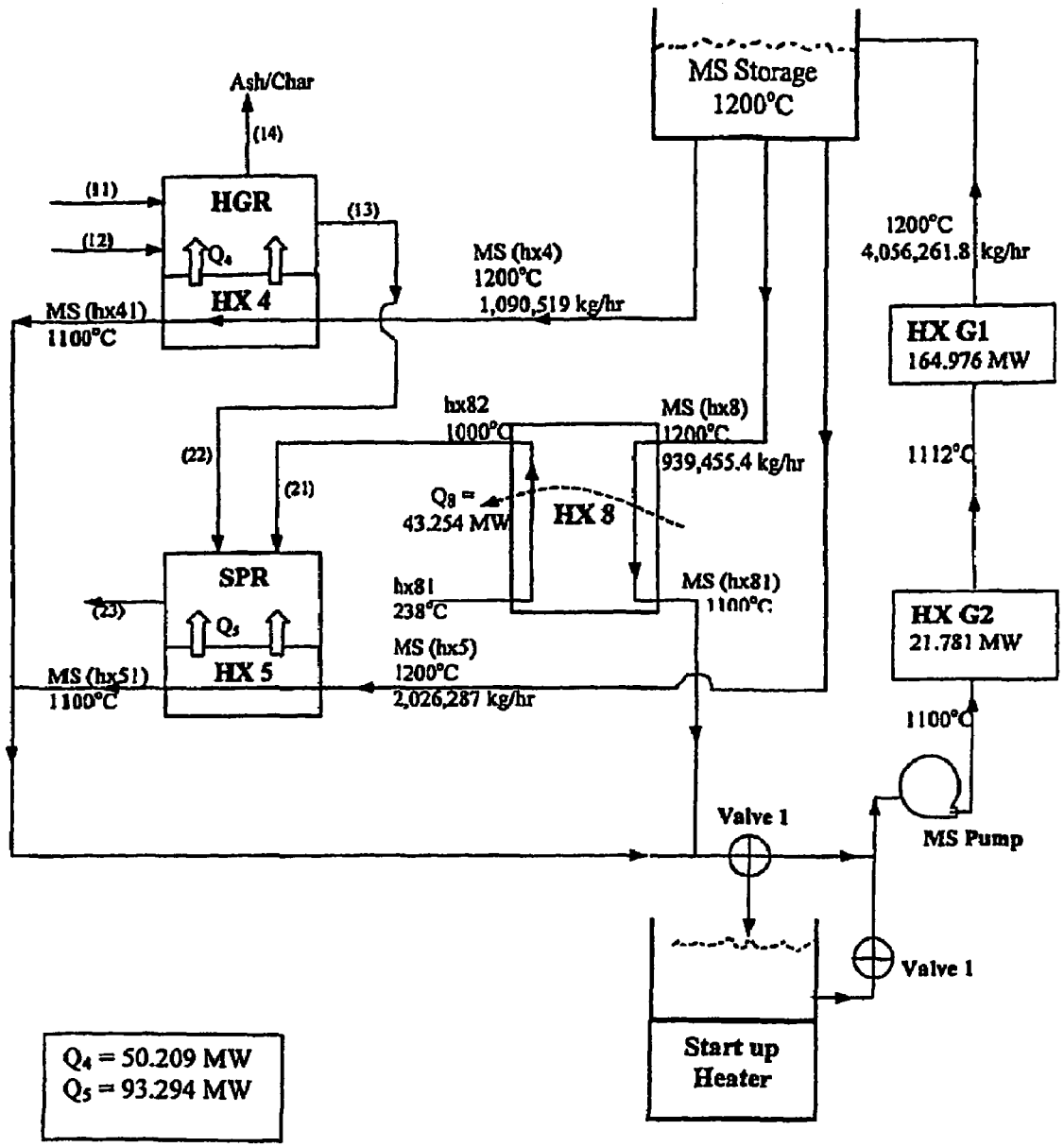
FIG. 18 is a diagram showing Molten Salt Flow Schematic of Biomass Hydro-gasification for production of Fischer-Tropsch paraffin fuels.
Figure 19:
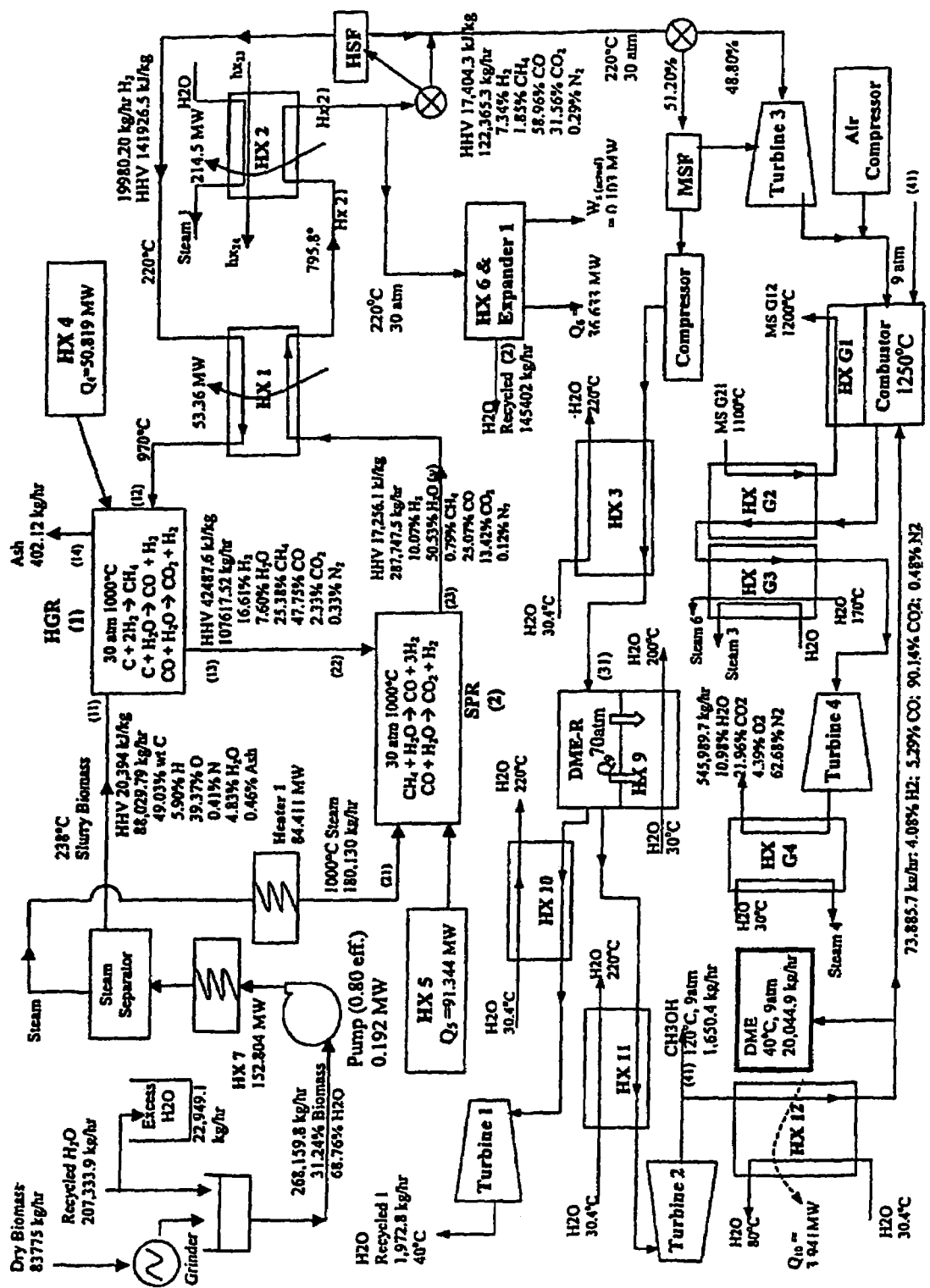
FIG. 19 is a diagram showing Mass Flow Schematic of Biomass Hydro-gasification for production of dimethyl ether.
Figure 20:
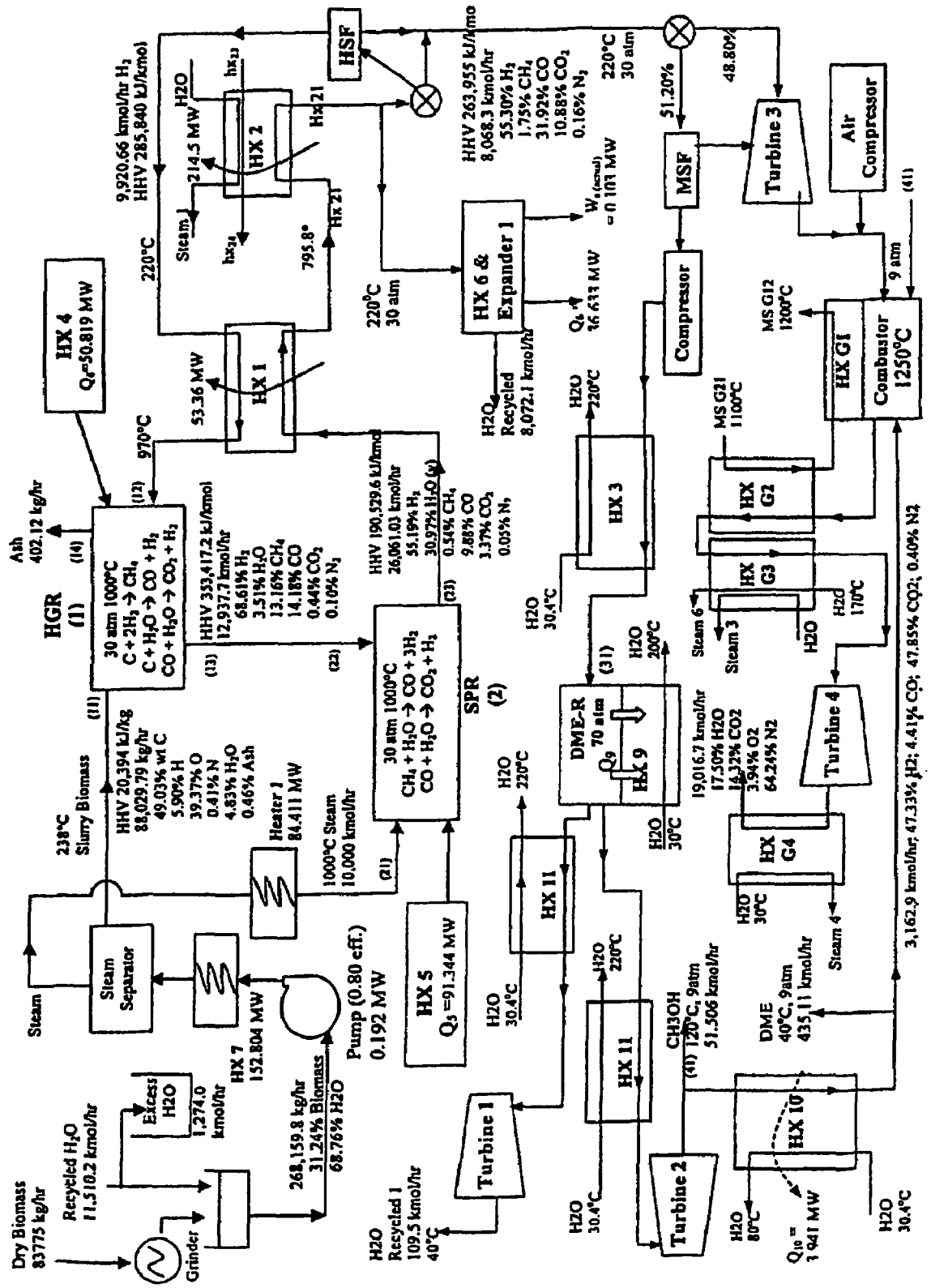
FIG. 20 is a diagram showing Mole Flow Schematic of Biomass Hydro-gasification for production of dimethyl ether.
Figure 21:
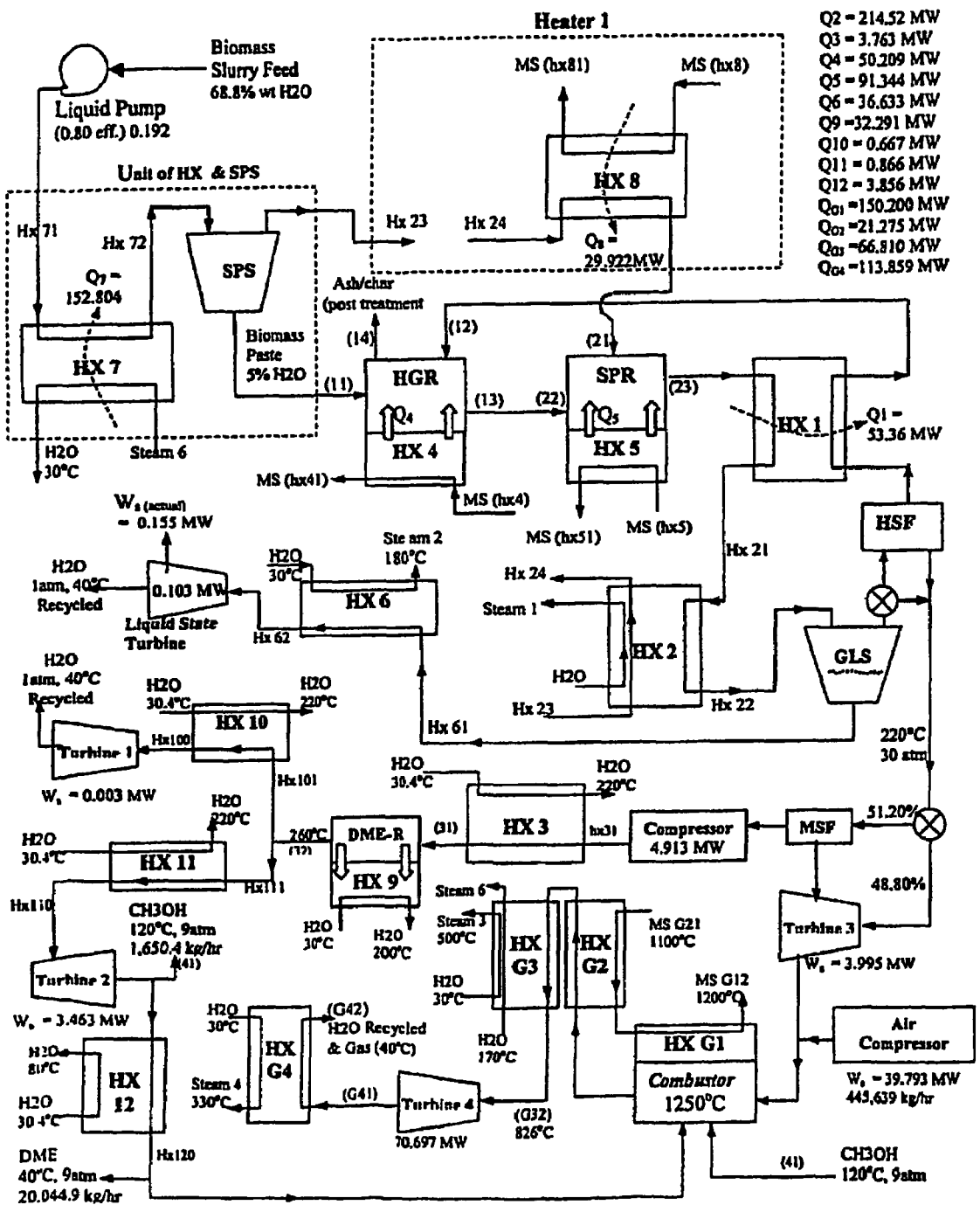
FIG. 21 is a diagram showing Thermal Energy Management Schematic of Biomass Hydro-gasification for production of dimethyl ether.
Figure 22:
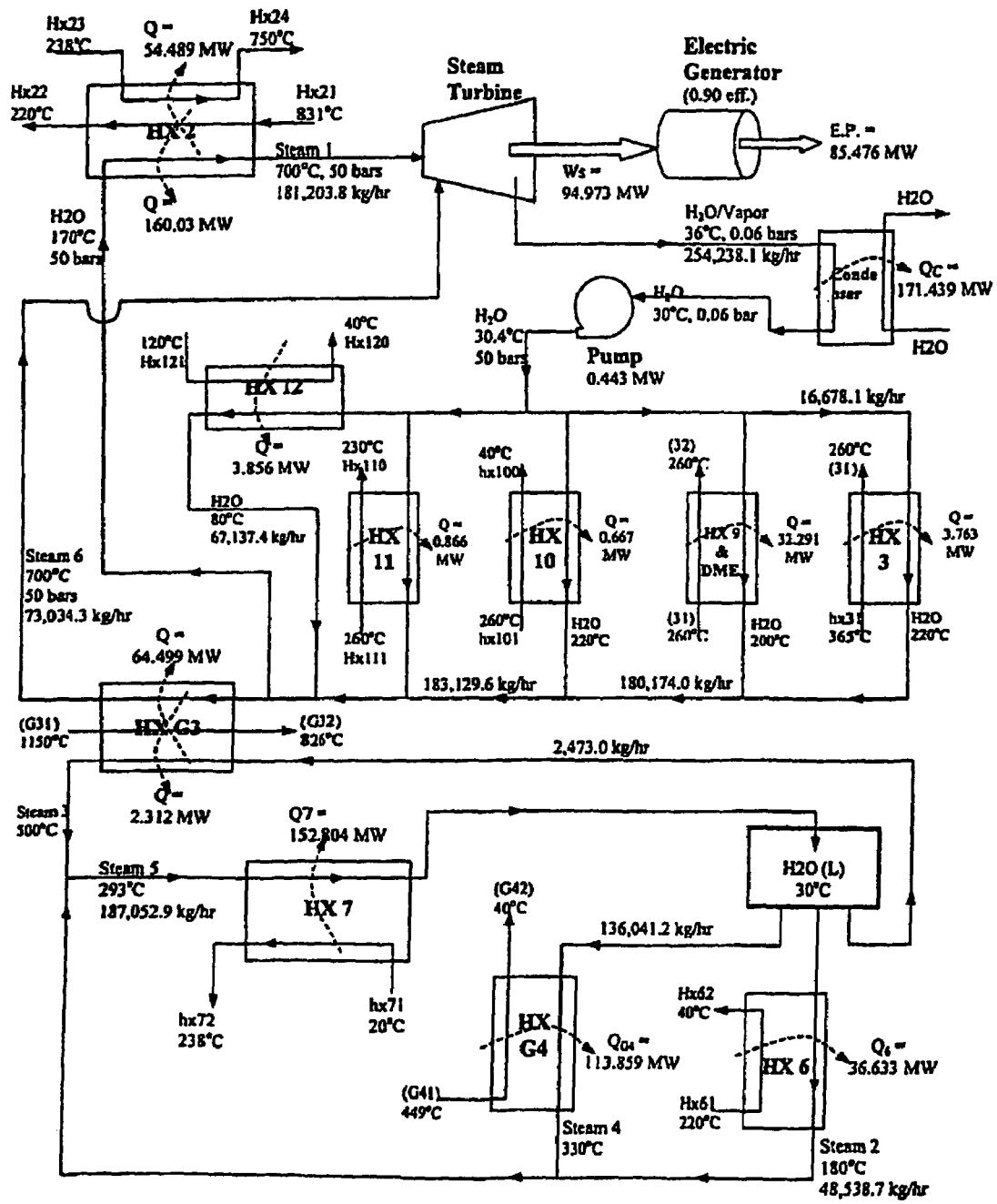
FIG. 22 is a diagram showing Water/Steam Flow Schematic of Biomass Hydro-gasification for production of dimethyl ether.
Figure 23:
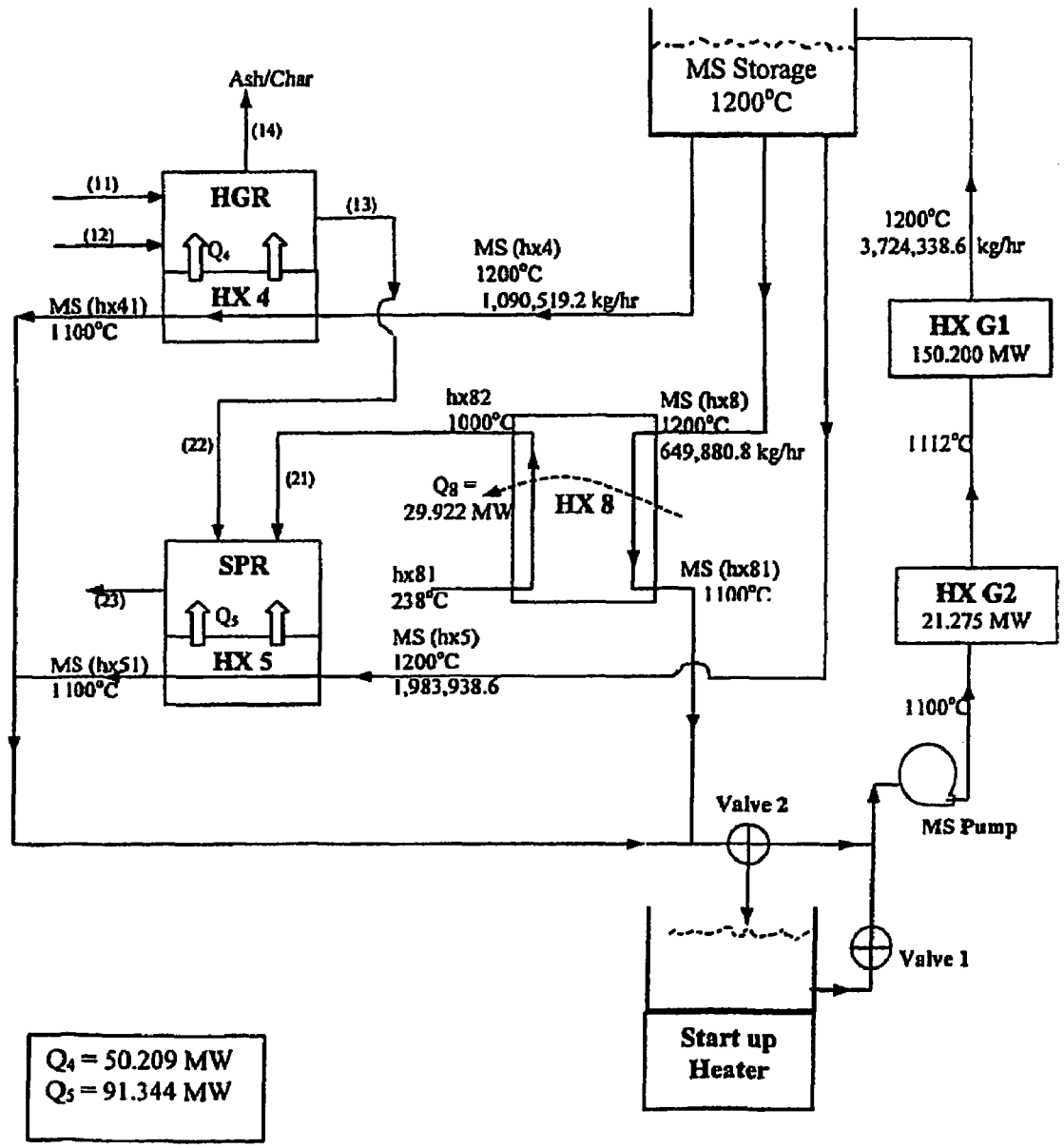
FIG. 23 is a diagram showing Molten Salt Flow Schematic of Biomass Hydro-gasification for production of dimethyl ether.
Figure 24:
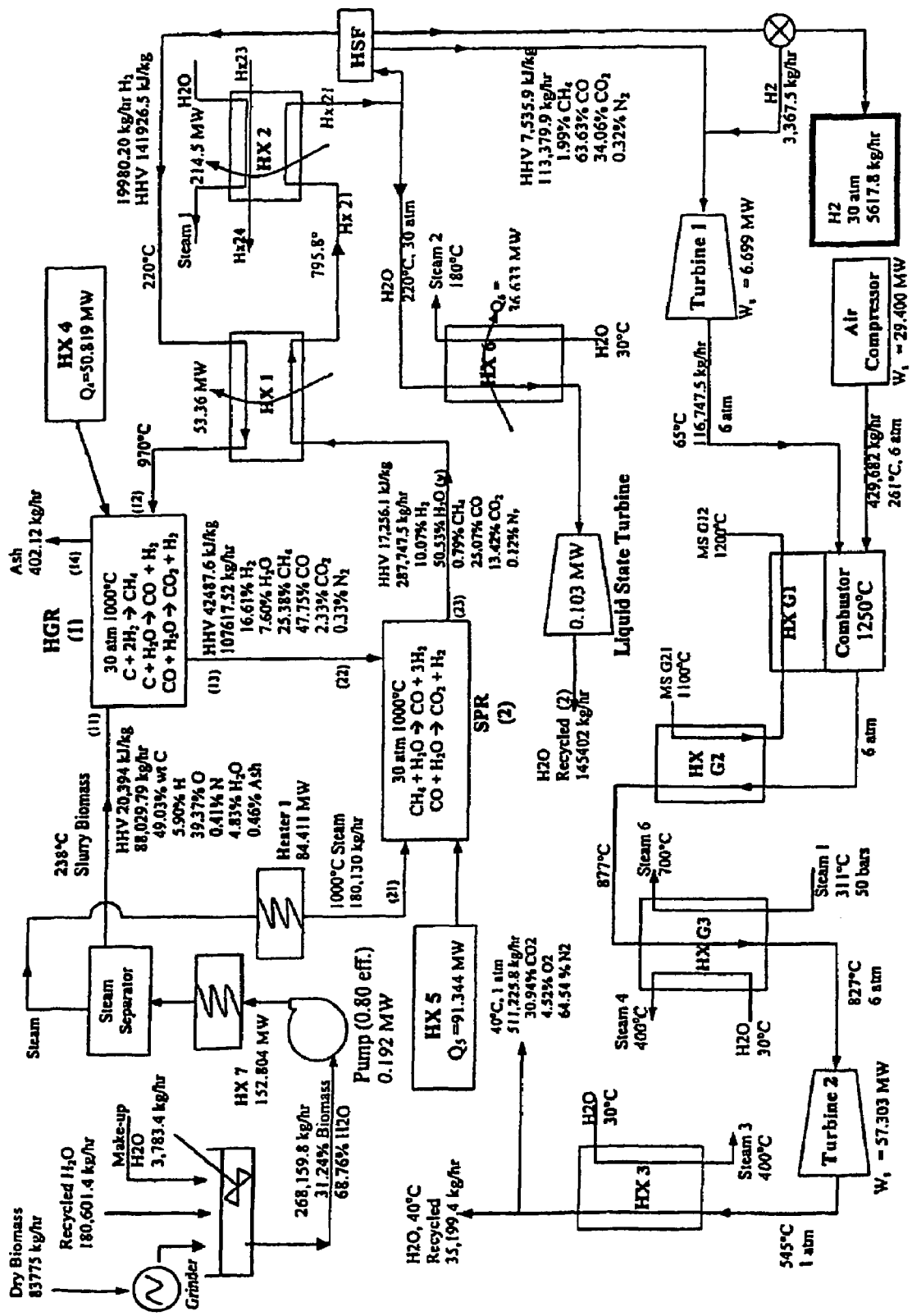
FIG. 24 is a diagram showing Mass Flow Schematic of Biomass Hydro-gasification for production of gaseous hydrogen fuel.
Figure 25:
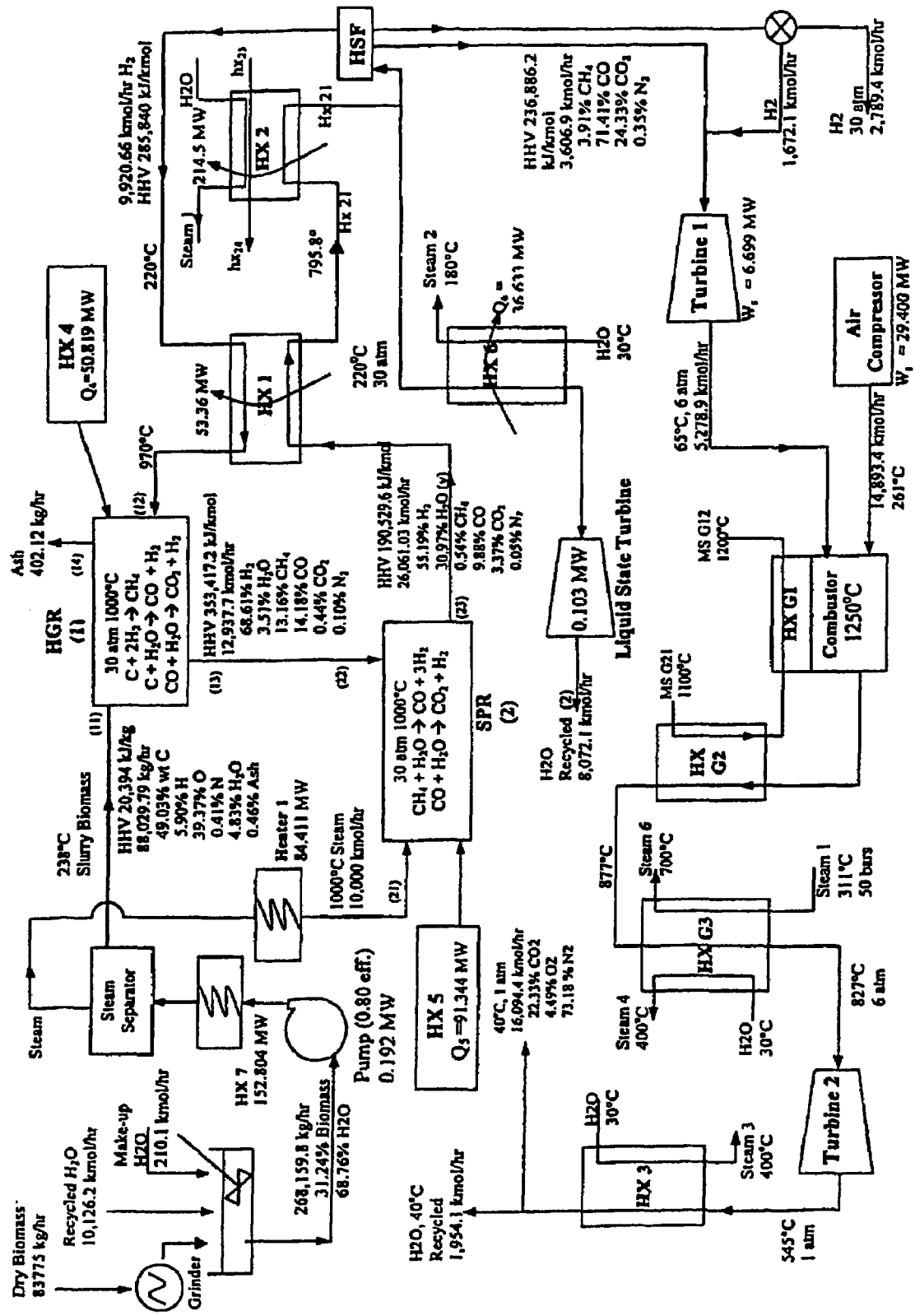
FIG. 25 is a diagram showing Mole Flow Schematic of Biomass Hydro-gasification for production of gaseous hydrogen fuel.
Figure 26:
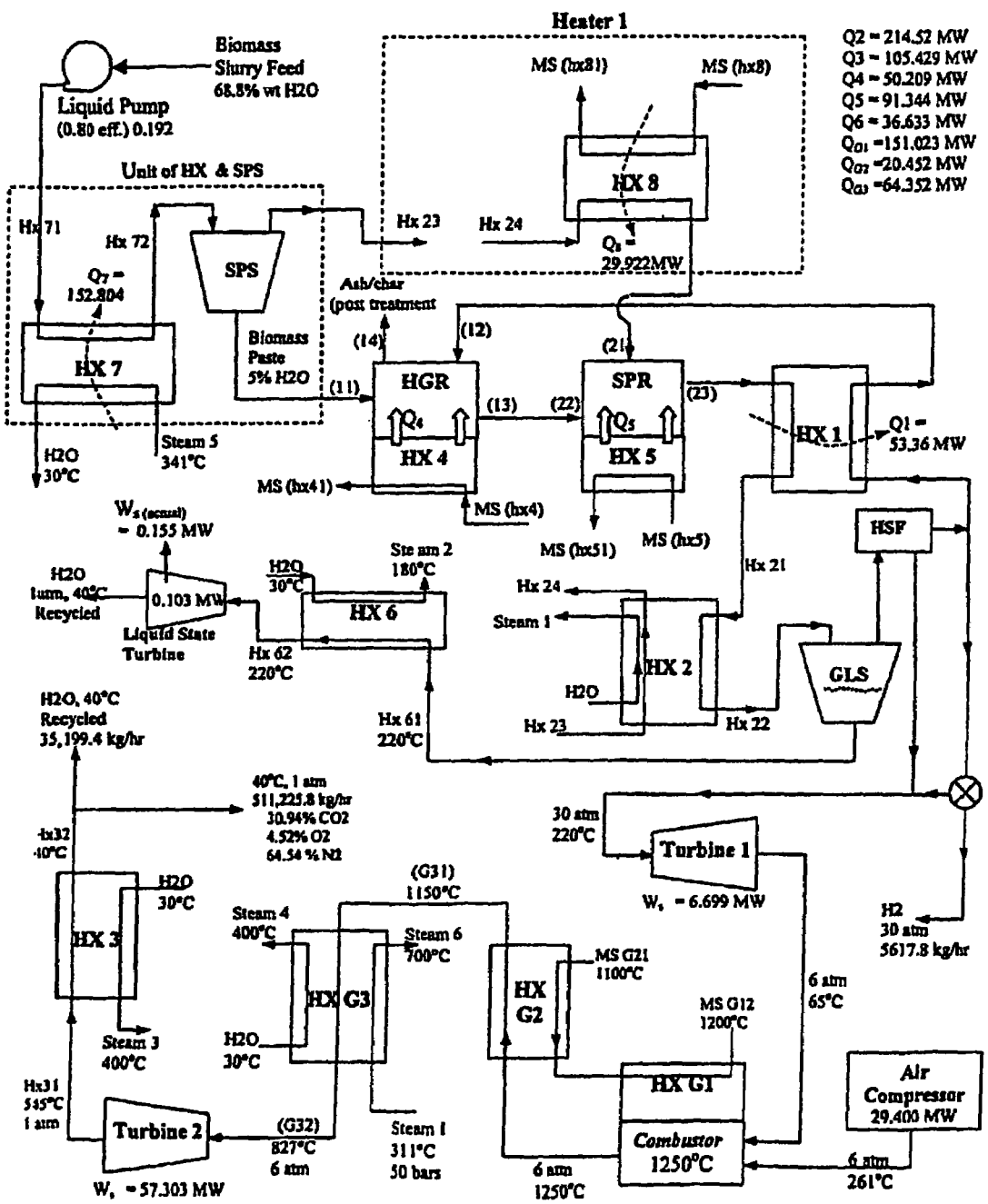
FIG. 26 is a diagram showing Thermal Energy Management Schematic of Biomass Hydro-gasification for production of gaseous hydrogen fuel.
Figure 27:
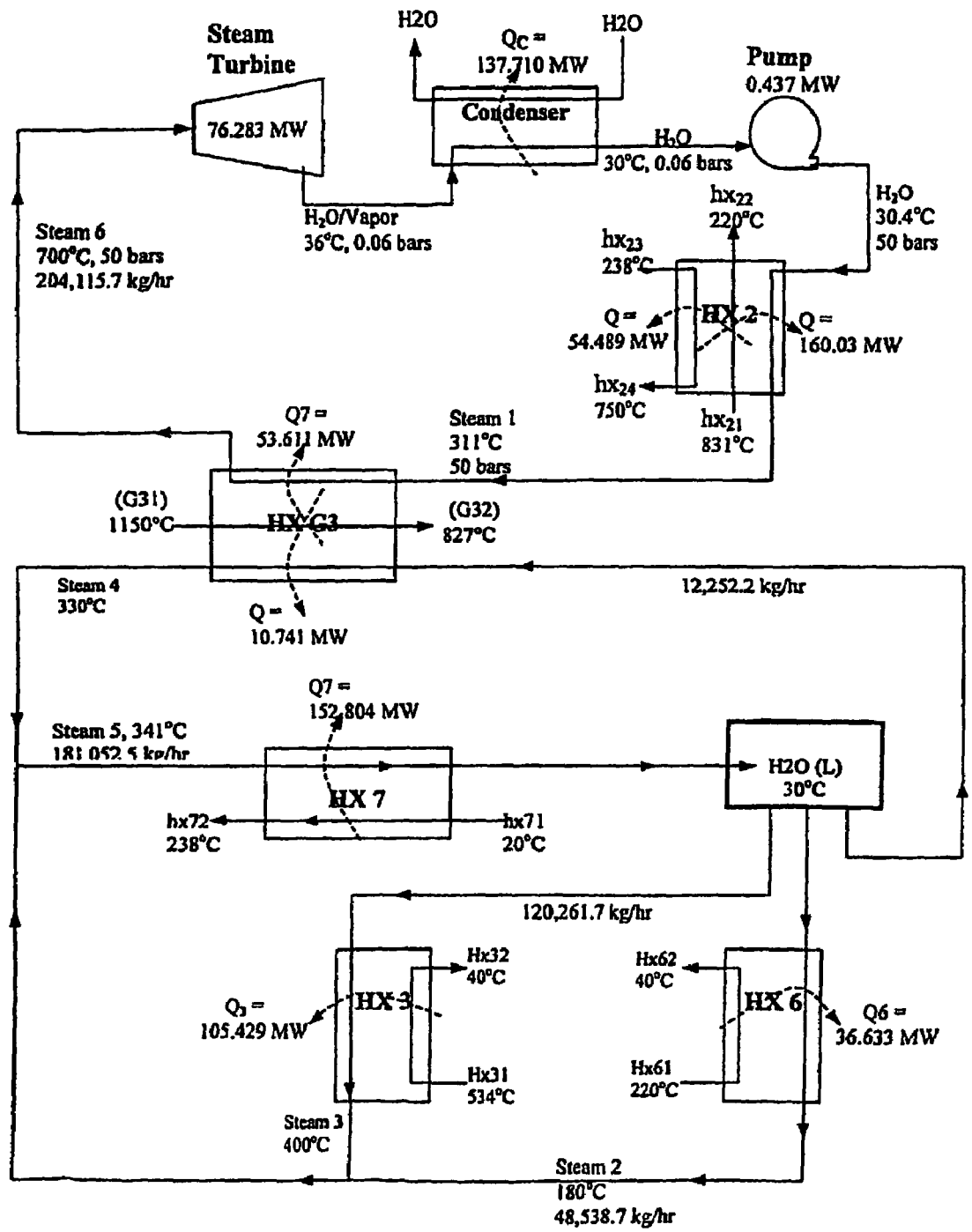
FIG. 27 is a diagram showing Water/Steam Flow Schematic of Biomass Hydro-gasification for production of gaseous hydrogen fuel.
Figure 28:
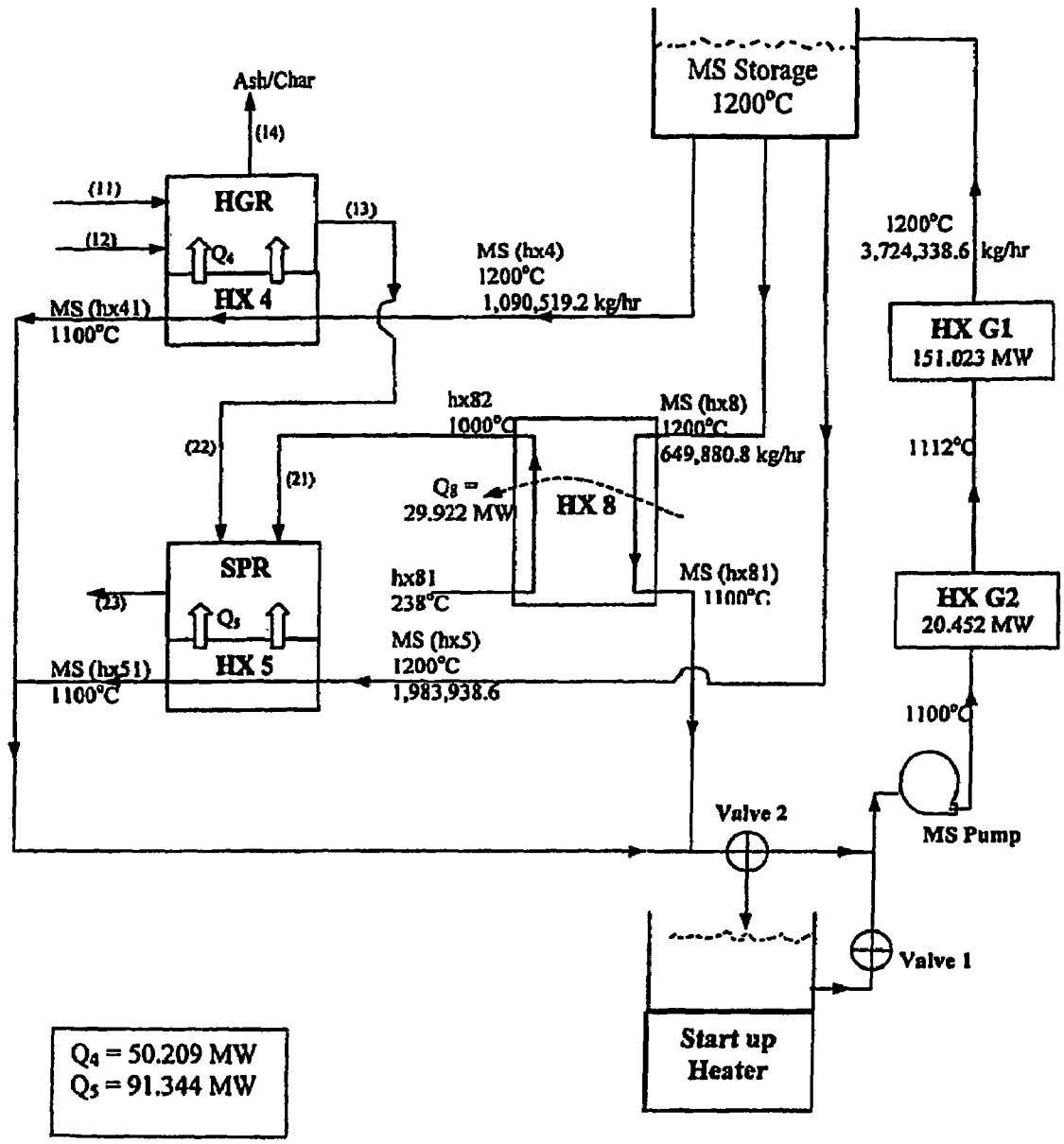
FIG. 28 is a diagram showing Molten Salt Flow Schematic of Biomass Hydro-gasification for production of gaseous hydrogen fuel.
Figure 29:
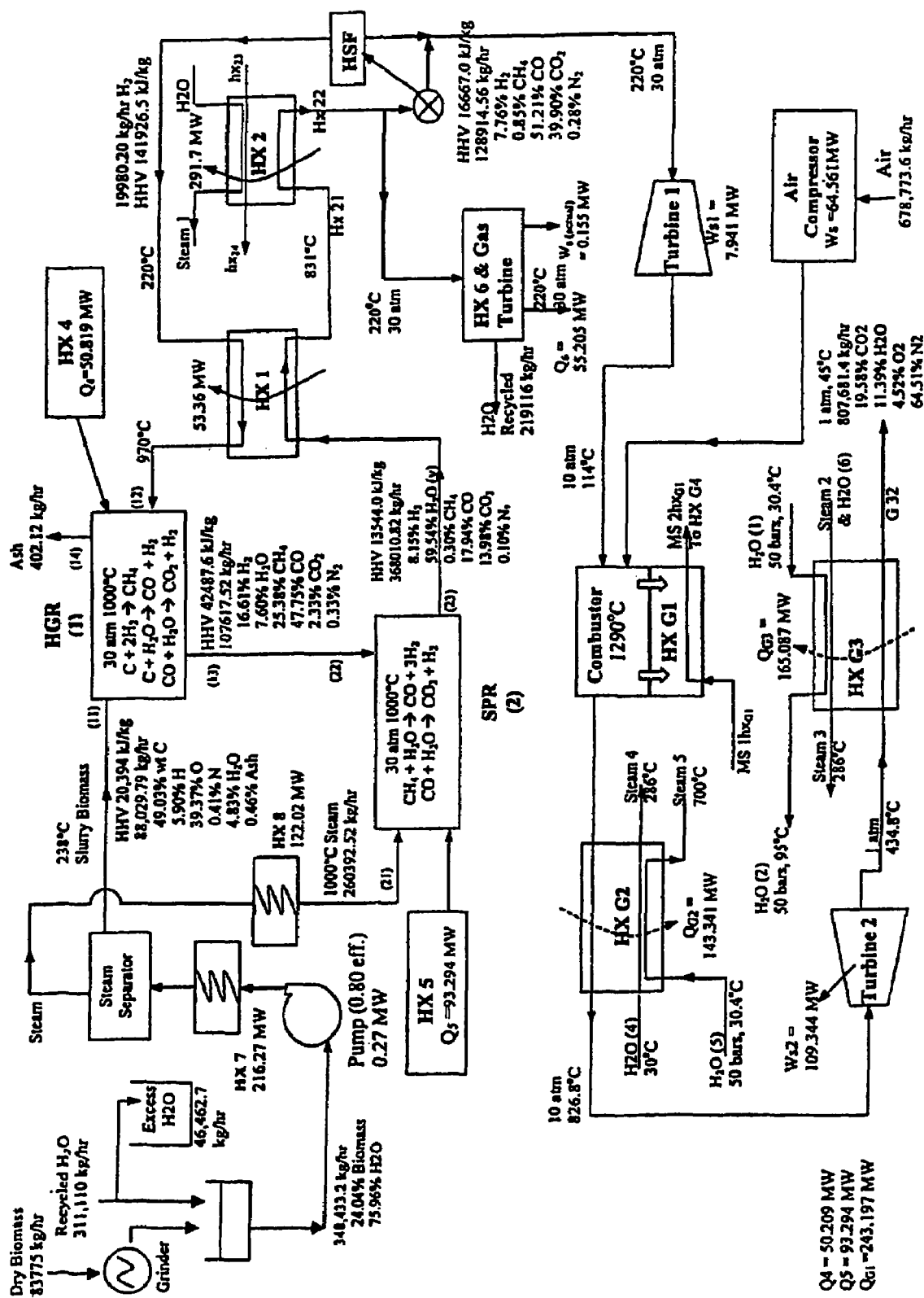
FIG. 29 is a diagram showing Mass Flow Schematic of Biomass Hydro-gasification for production of electricity.
Figure 30:
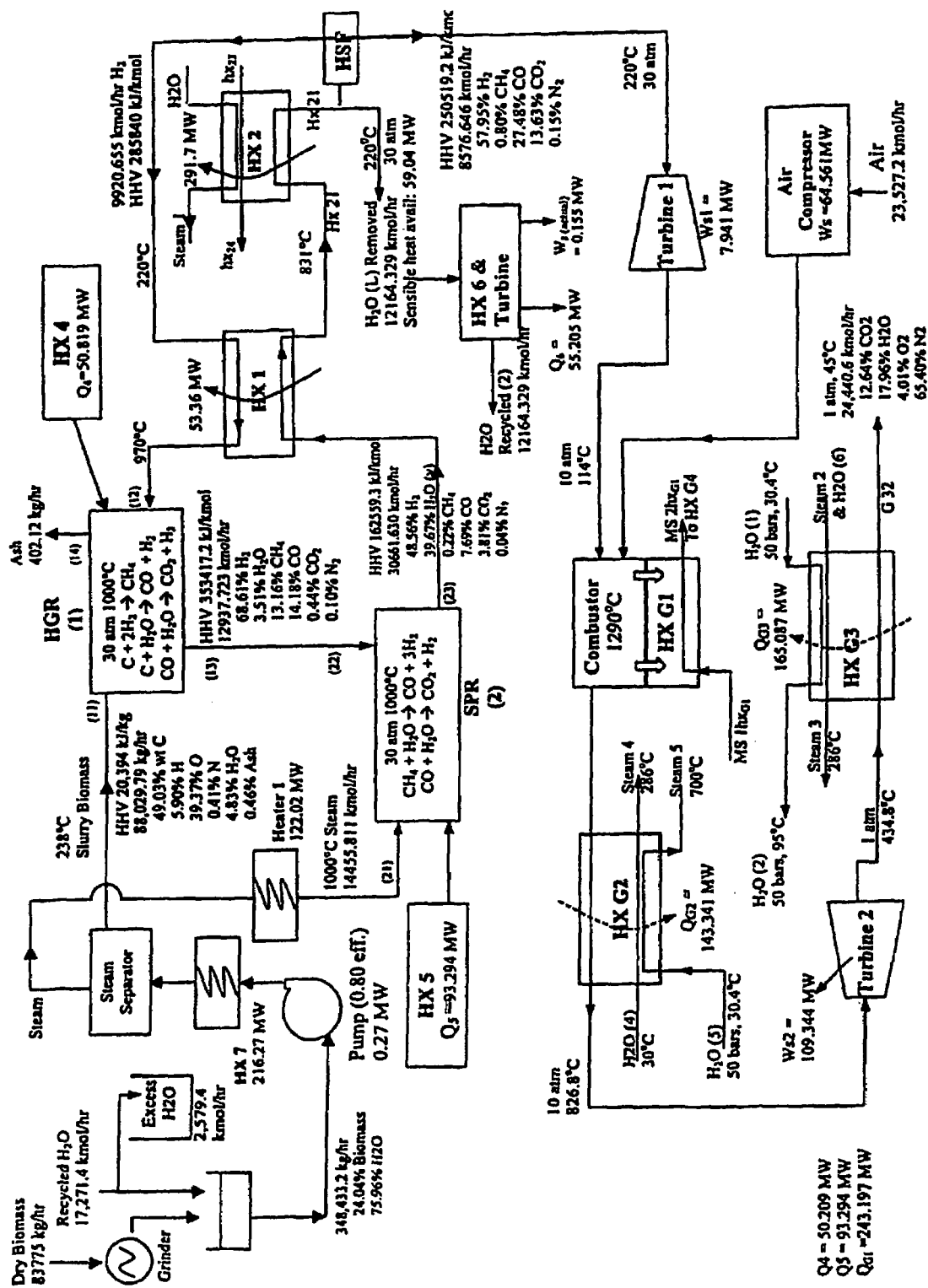
FIG. 30 is a diagram showing Mole Flow Schematic of Biomass Hydro-gasification for production of electricity.
Figure 31:
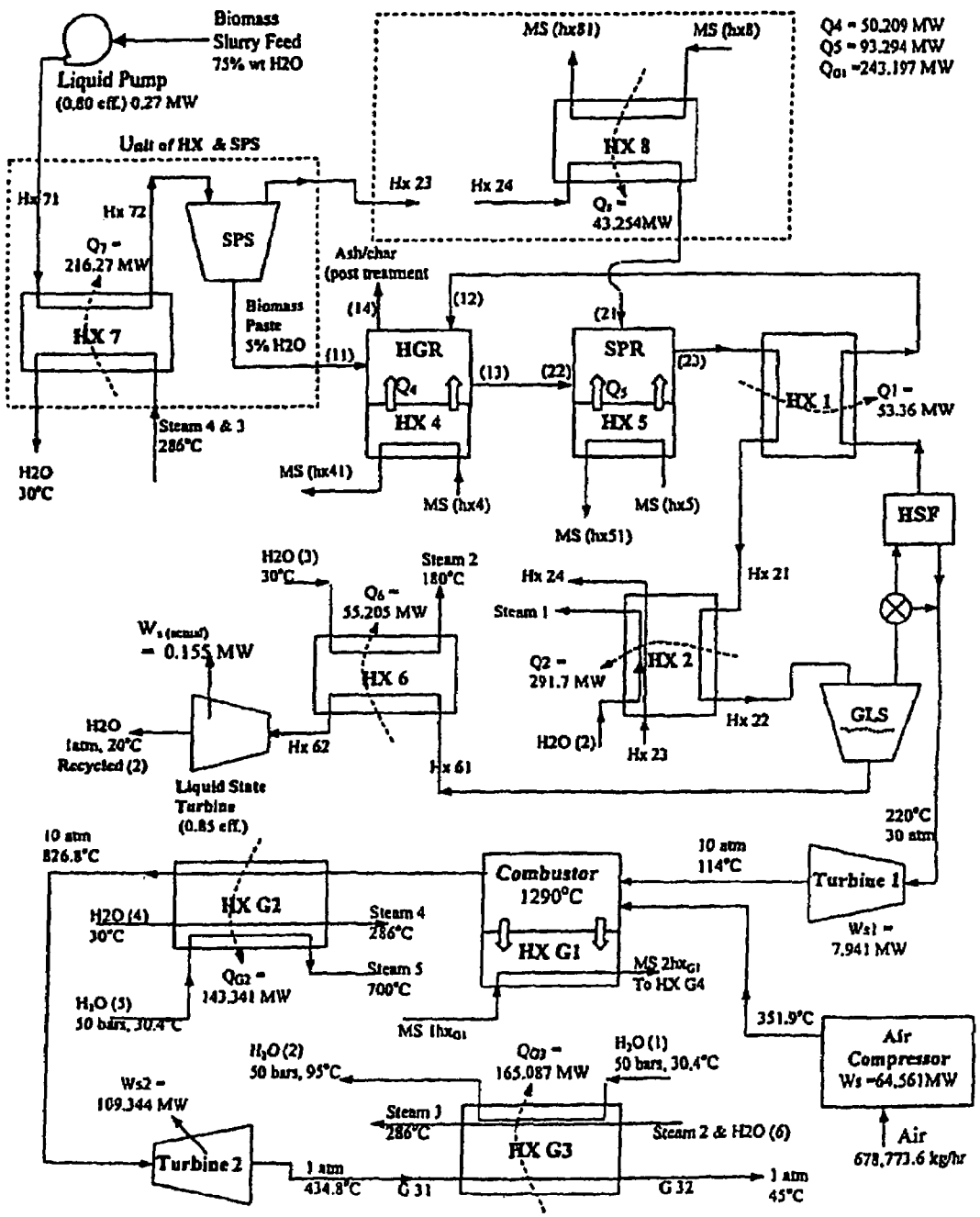
FIG. 31 is a diagram showing Thermal energy Management Schematic of Biomass Hydro-gasification for production of electricity.
Figure 32:
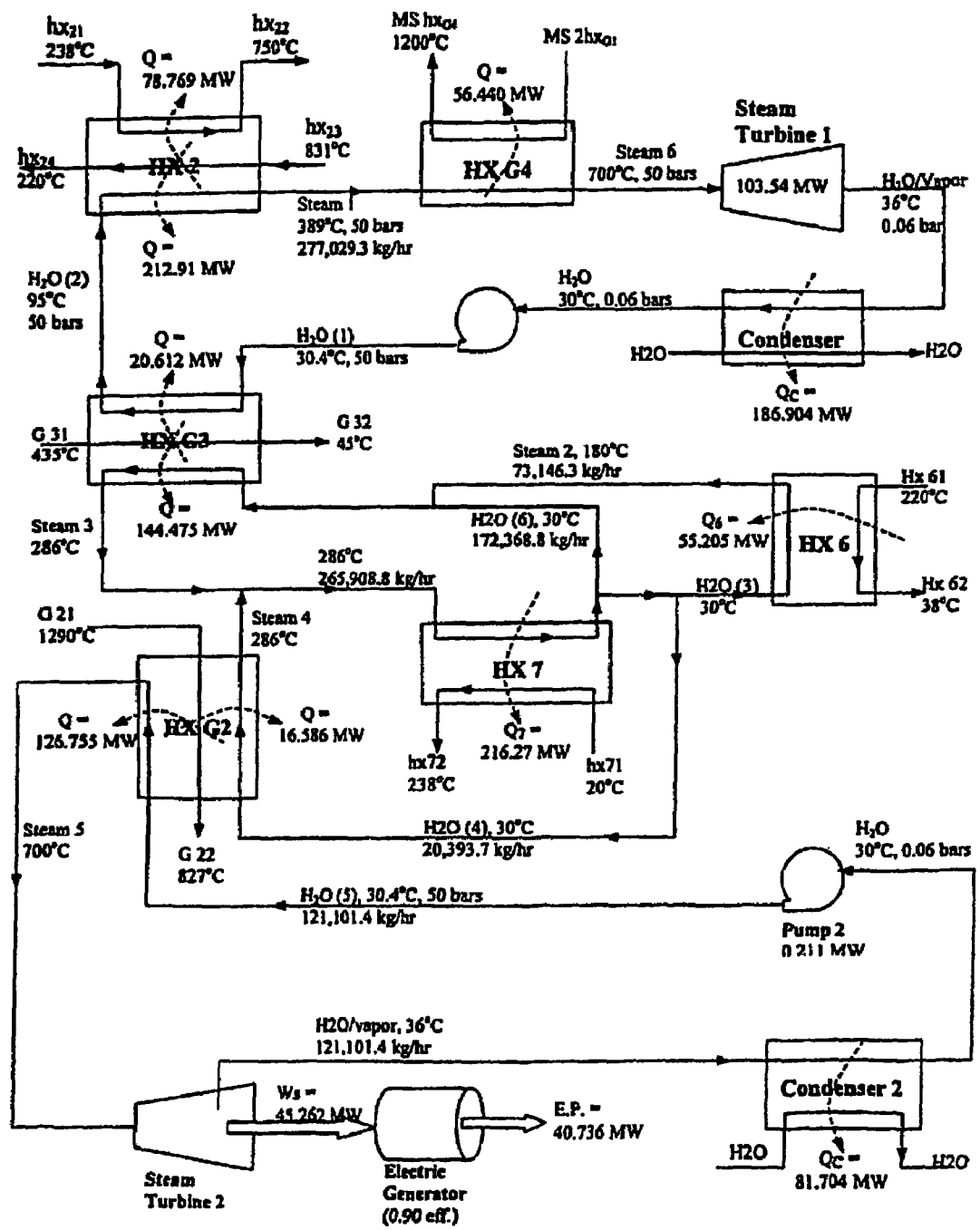
FIG. 32 is a diagram showing Water/Steam Flow Schematic of Biomass Hydro-gasification for production of electricity.
Figure 33:
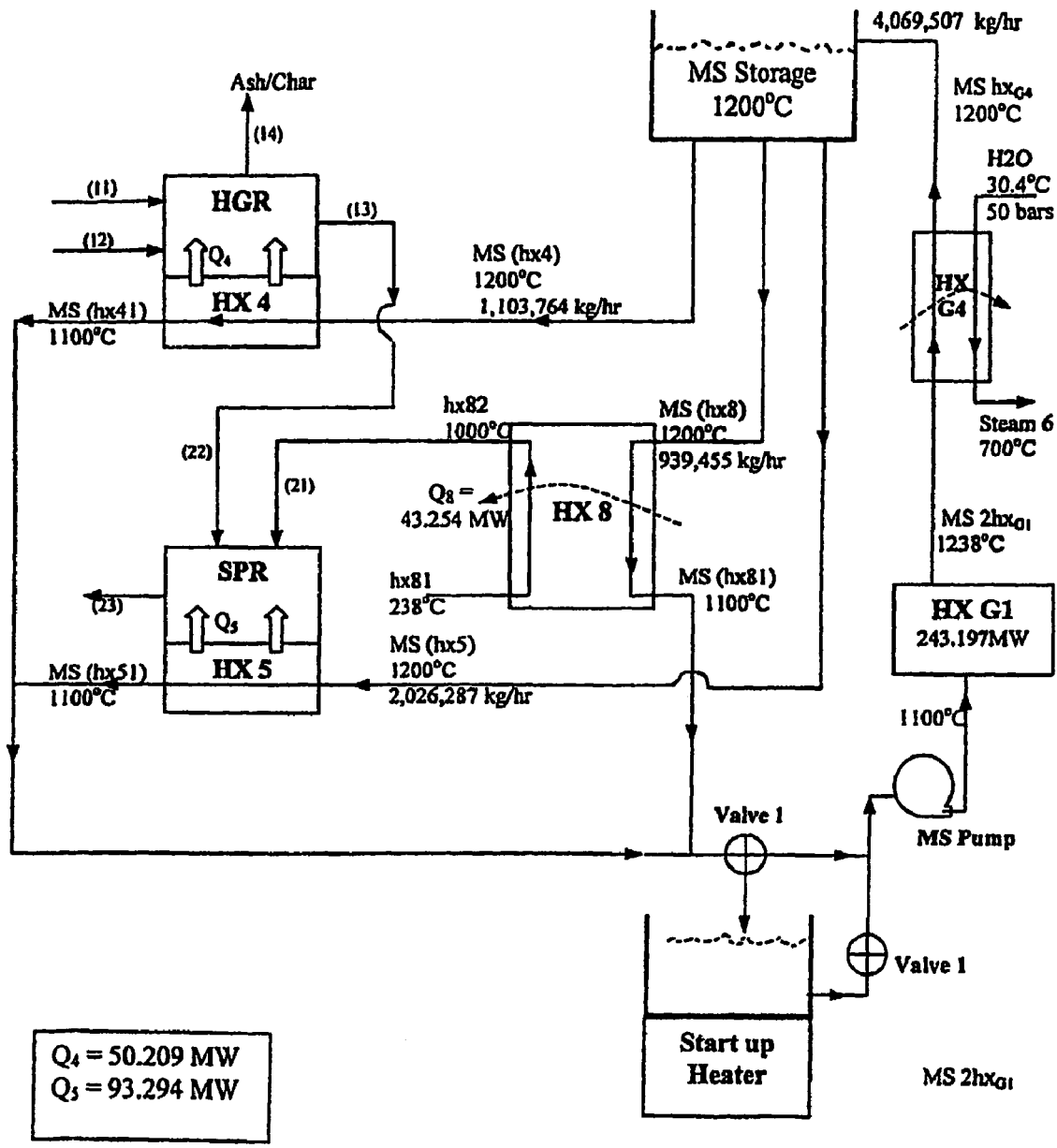
FIG. 33 is a diagram showing Molten Salt Flow Schematic of Biomass Hydro-gasification for production of electricity.
Figure 34:
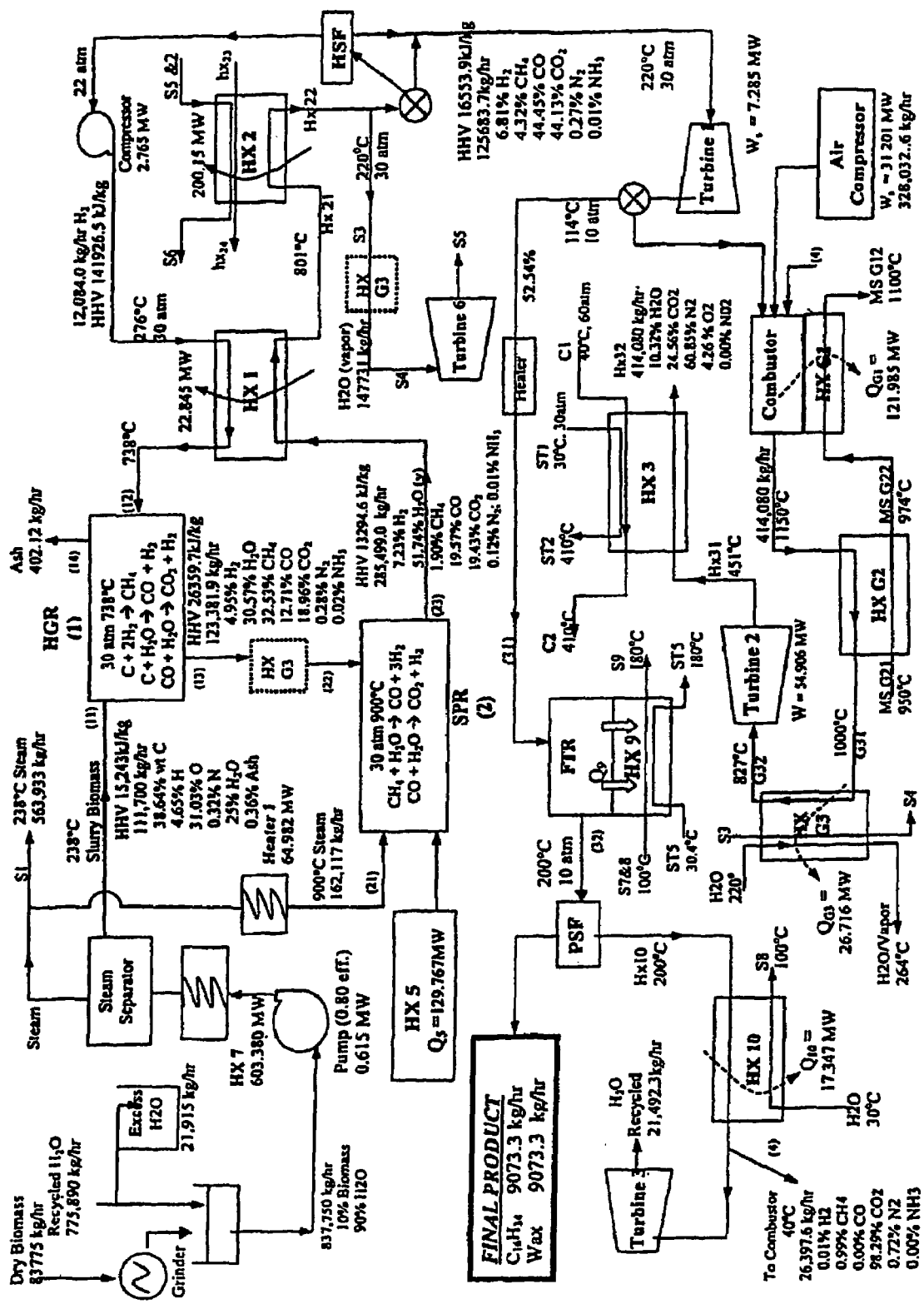
FIG. 34 is a mass flow schematic of biomass hydro-gasification for Fischer-Tropsch paraffin fuel production using an adiabatic HGR and a 9:1 water feed.
Figure 35:
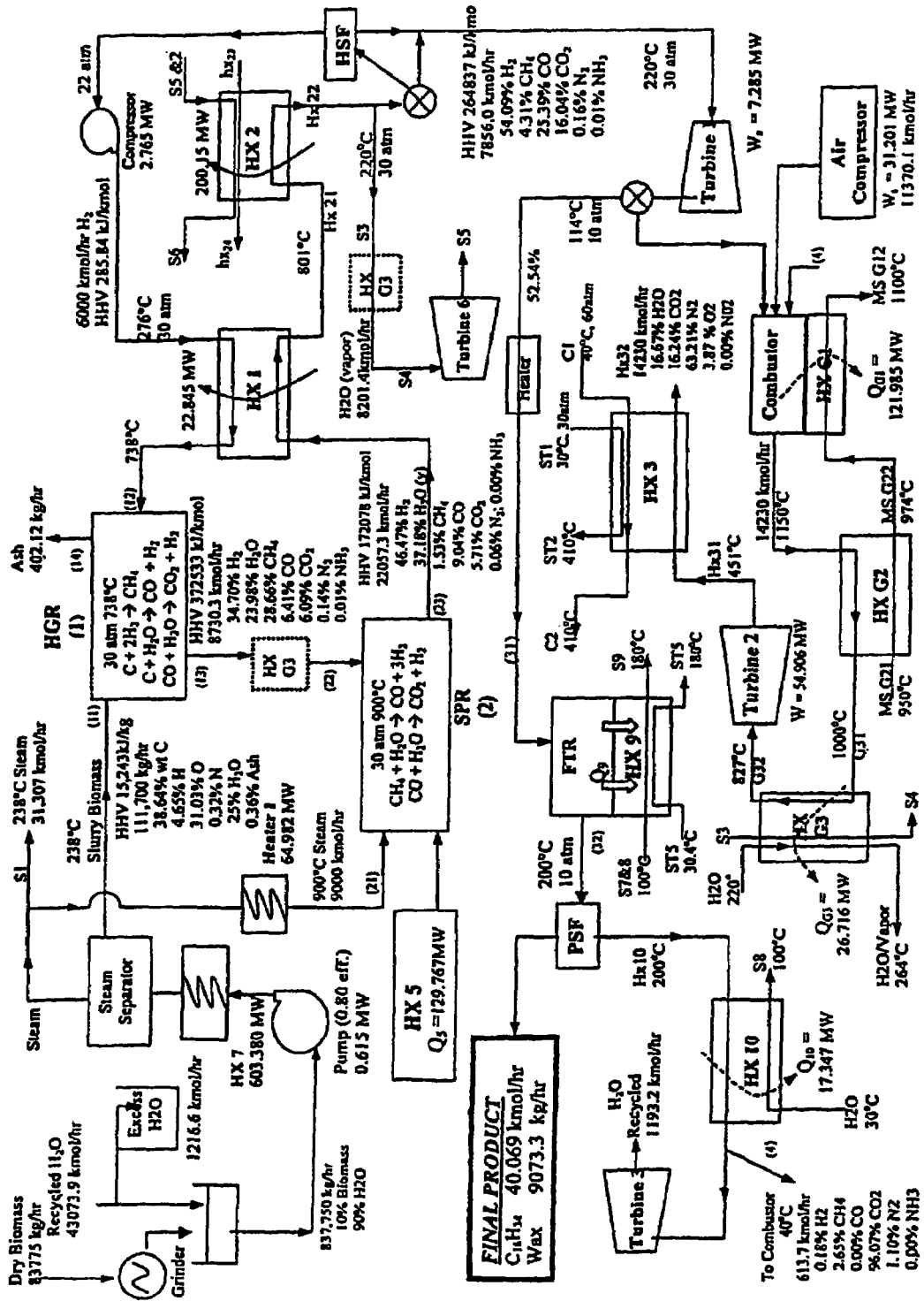
FIG. 35 is a molal flow schematic of biomass hydro-gasification for Fischer-Tropsch paraffin fuel production using an adiabatic HGR and a 9:1 water feed.
Figure 36:
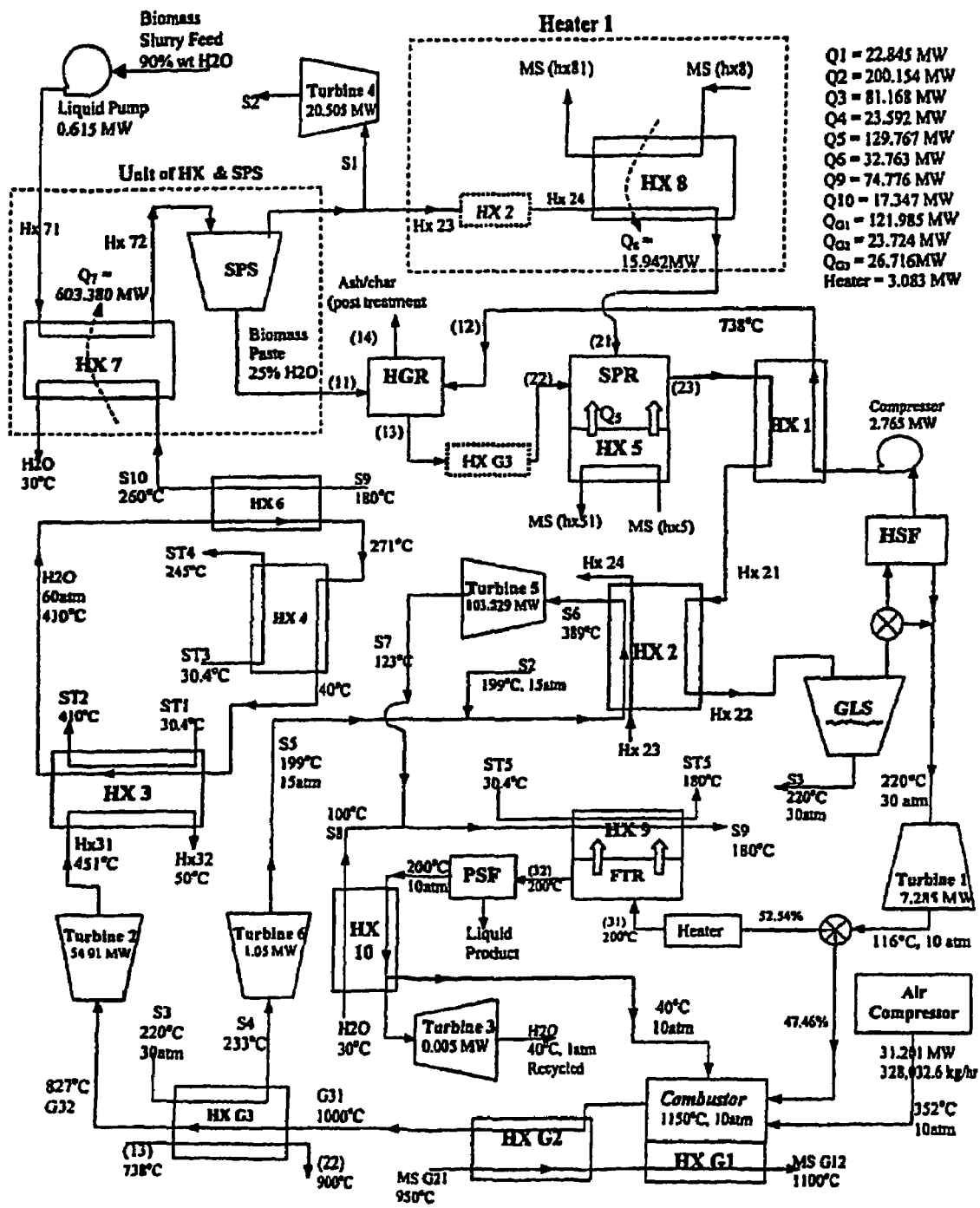
FIG. 36 is a thermal energy management schematic of biomass hydro-gasification for Fischer-Tropsch paraffin fuel production using an adiabatic HGR and a 9:1 water feed.
Figure 37:
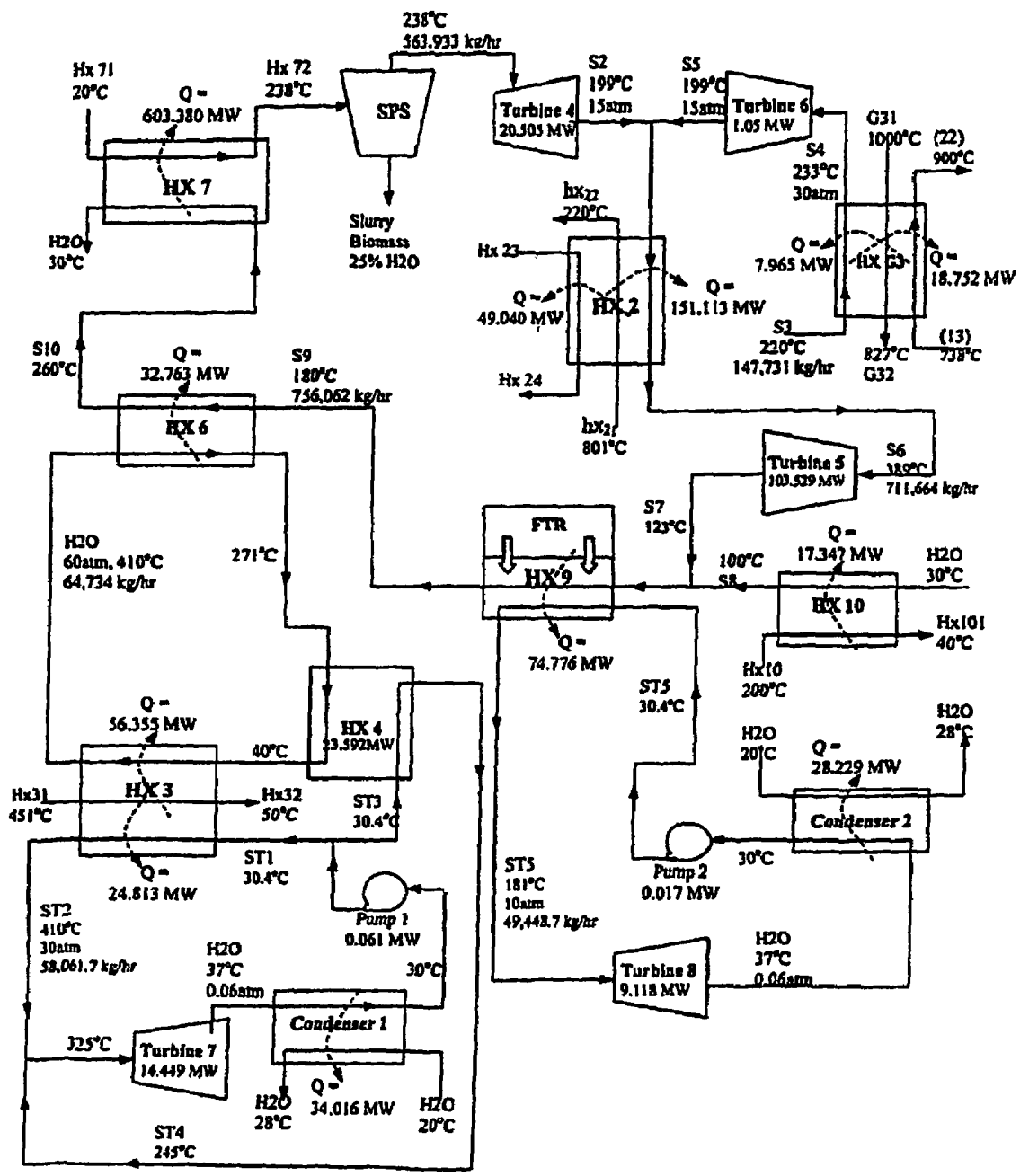
FIG. 37 is a water/steam flow schematic of biomass hydro-gasification for Fischer-Tropsch paraffin fuel production using an adiabatic HGR and a 9:1 water feed.
Figure 38:
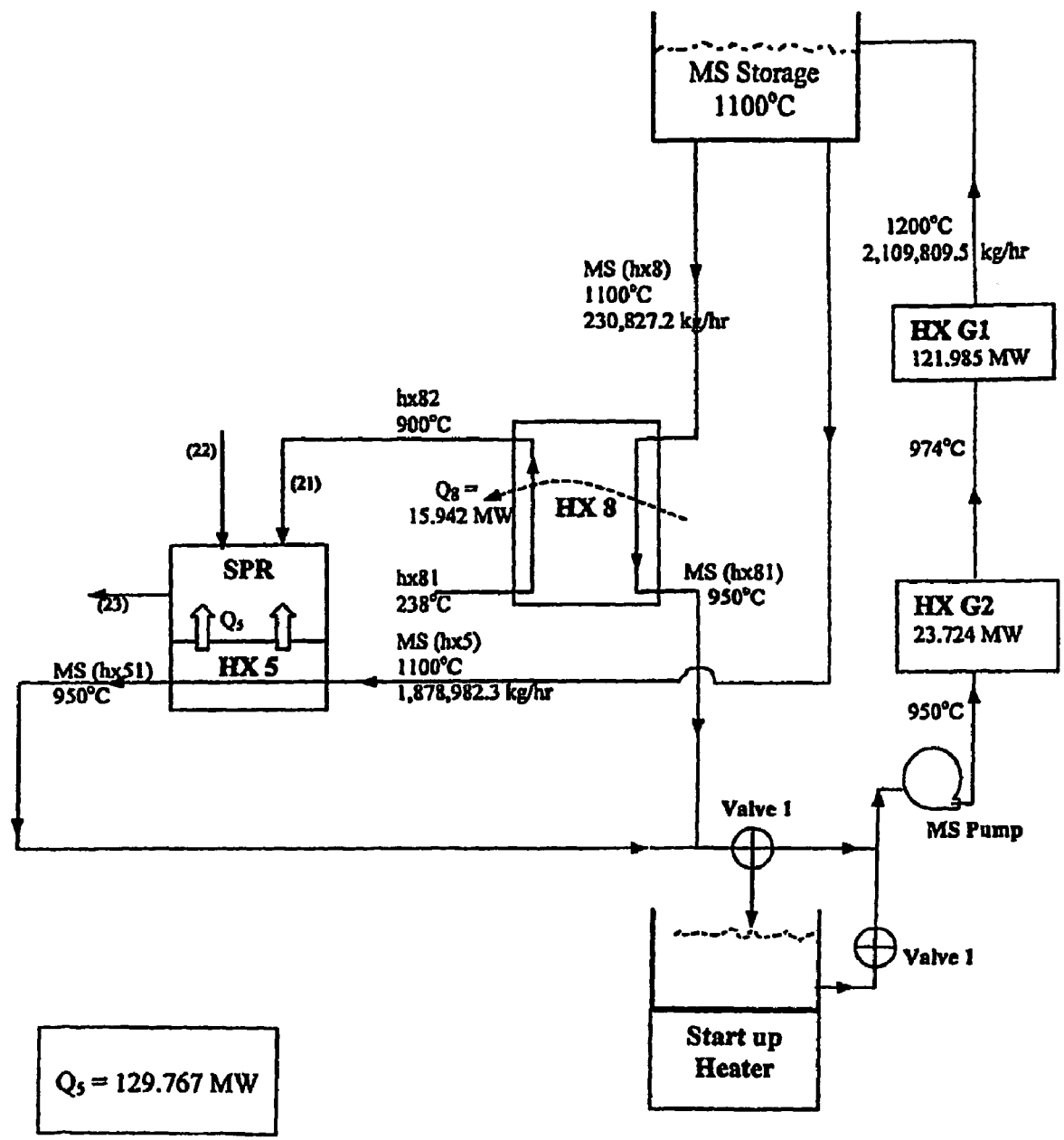
FIG. 38 is a molten salt flow schematic of biomass hydro-gasification for Fischer-Tropsch paraffin fuel production using an adiabatic HGR and a 9:1 water feed.

FIG. 10 shows the ratio of $H_2$ and CO available for feed into the Fischer-Tropsch fuel synthesis reactor, against the steam content added to the SPR at 800° C. and 30 atm. This ratio increases with the increasing amount of steam added to the SPR and reaches 2.1 at about 3.94 mol steam (or water) added per mol C in feedstock. With this amount of steam added, the system will achieve chemical and thermal self-sustainability and provide a proper ratio of $H_2$ and CO for Fischer-Tropsch synthesis of cetane. FIG. 11 shows the effect of $H_2O$ added to the SPR at 800° C. and 30 atm. FIGS. 12 and 13 show the effect of temperature and pressure on the $H_2$ and CO ratio and the conversion of $CH_4$ in the SPR. At higher temperature and lower pressure, this ratio is higher. In a similar trend with the $H_2$ and CO ratio, the conversion of $CH_4$ increases with increasing temperature and with decreasing pressure. It is thus high temperature and low pressure favored in the SPR.

The products of Fischer-Tropsch paraffinic liquid fuels are in a wide range of carbon number. According to the above Rentech report, about half of the products are diesel fuel. Also about half of the products come in the form of wax, with minor amounts of gases such as un-reacted reactants and hydrocarbon gases (methane, ethane, propane and so forth). To exemplify the present invention, cetane, which is in middle position of diesel range ($C_{11}$ to $C_{20}$), was chosen as diesel fuel.

The results of thermo-chemical and thermodynamic modeling of the hydro-gasified conversion of waste wood (biomass), as a prototypical carbonaceous feed material, were used to examine the details and illustrate the features of this invention. These simulations of the novel sequence of process reactors were undertaken to discover the thermo-chemical conditions needed to achieve the production of synthetic fuels. For example, in the production of synthetic diesel fuel, the objectives were to attain self-sustained operation of the first stage hydro-gasifier. In a particular embodiment, this is accomplished at an equilibrium temperature of 1000° C. (738° C. when adiabatic) and 30 atmospheres pressure with a total hydrogen to carbon feed mole ratio of at least 3.48:1 (1.67:1 when adiabatic), and water to carbon feed ratio of at least 0.07:1 (0.43 when adiabatic), a water steam to carbon feed mole ratio of at least 3.91:1 (1.67:1 when adiabatic) into the second stage steam reforming reactor also operating at an equilibrium temperature of 1000° C. (900° C. when adiabatic) and 30 atmospheres pressure, to obtain conditions for simultaneous optimal quantities of product hydrogen for self-sustained operation of the first stage hydro-gasification reactor and an adequate hydrogen to carbon mole ratio of at least 2.1:1 in the residual synthesis gas stream to feed the third stage Fischer-Tropsch reactor, operating at 200° C. and 10 atmospheres pressure, and adiabatic self-sustained operation of a special HGR and SPR combination reactor, followed by a conventionally operated SPR and Fischer-Tropsch reactors, with full thermal and chemical potential energy management.

Tables 1 through 5 show the overall energy transfer rates into and out from each heat exchanger and power conversion component for each operating mode of the conversion process. The mass flow, molal flow, thermal energy management, water/steam and molten salt schematic diagrams for each of the five operating modes of the conversion process are also shown as FIGS. 14–18, 19–23, 24–28, 29–33 and 34–38 respectively. Tables 6 and 7 summarize the results of the performance studies and process configuration parameters for each of the five operating modes of the conversion process.

The carbonaceous material feed process initially described above uses a water slurry suspension feed technology, originally developed by Texaco for use in its partial-oxidation gasifiers, that can accept a wide variety of carbonaceous materials, and can be metered by controlled pumping into the first stage hydrogen gasification reactor (HGR) to produce a methane rich gas with high conversion efficiency (measured to have at least 85% carbon feed chemical utilization efficiency). Enough heat is available to be able to generate super-heated steam from the biomass-water slurry feed to supply and operate the second stage steam-methane reformer. The reformer product gas is fed into a hydrogen membrane filter that allows almost pure hydrogen to pass back into the first stage reactor to sustain the hydro-gasification of the biomass. The remaining second stage product gas, not passing through the hydrogen filter, is cooled to condense and re-cycle any water vapor present back into the slurry carbonaceous feed system. The unfiltered gas is fed into the fuel synthesis reactors, which comprise a Fischer-Tropsch paraffin hydro-carbon synthesis reactor, which operates at 200° C. and 10 atmospheres pressure. Process modeling reveals that the hydrogen/carbon molecular feed ratio must be at least 2.1:1 to optimize production of chemically pure and clean-burning [sulfur-free] diesel-like liquid fuels and high value chemically pure paraffin-like waxes, without additional fuel or energy. (FIGS. 14–18 and Tables 1, 6 and 7 or FIGS. 34–38 and Tables 5, 6 and 7 for adiabatic first stage reactor operation), or a dimethyl ether synthesis reactor, which operates at 200° C. and 70 atmospheres pressure. This reactor produces approximately 92.4% DME and 7.1% methanol. The methanol is combusted to co-generate about 30 MW of electricity and 20 MW of process heat for exchange with the molten salt and water/steam heat transfer loops (see FIGS. 19–23 and Tables 2, 6 and 7), hydrogen gaseous fuel synthesis (see FIGS. 24–28 and Tables 3, 6 and 7), and all electric power production without fuel synthesis (see FIGS. 29–33 and Table 4, 6 and 7).

Net export of electric power is possible in all five modes of operation of the simulated biomass hydro-gasification process plant. The results of these simulations are summarized in Table 6 and 7. The overall energy utilization goes from 50.7% (71.2% when adiabatic) for Fischer-Tropsch synthesis to 67.2% for hydrogen production. Optimized electric power production utilizes about 38.2% of the chemical potential energy in the biomass feed stock for clean-burning power conversion. In general the process modes could be switched using an appropriate proportional valve to distribute the synthesis gas production after separation of enough pure hydrogen gas for the first stage hydro-gasification reactor.

The results of the overall modeling shown in FIG. 1 are summarized as follows.

1. Optimum conditions of the HGR: Operating at 1000° C. and 30 atm; 2.76 mol $H_2$ per mol C in feedstock to maintain self-sustainability; 0.066 mol $H_2O$ per mol C in feedstock.

2. Optimum conditions of the SPR: Operating at 1000° C. and 30 atm; 4.022 mol $H_2O$ per mol C in feedstock.

3. Fischer-Tropsch products: 0.199 ton wax per ton of feedstock; 68.3 gallons of cetane ($C_{16}H_{34}$) diesel per ton of feedstock.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process and apparatus described in the specification. As one of ordinary skill in the art will readily appreciate from the disclosure of the present invention, processes and apparatuses, presently existing or later to be developed that perform substantially the same function or achieve substantially the same result as the corresponding embodiments described herein may be utilized according to the present invention. Accordingly, the appended claims are intended to include within their scope such processes and apparatuses.

TABLE 1

Biomass conversion optimized for production of Fischer-Tropsch Paraffins

| Component | | Energy rate in (MW) | | | Energy rate out (MW) | | |
|---|---|---|---|---|---|---|---|
| | | PCE | Heat | Work | PCE | Heat | Work |
| Heat Exchangers | | | | | | | |
| HX 1 | | | 53.4 | | | 53.4 | |
| HX 2 | Portion 1 | | | | | 78.8 | |
| | Portion 2 | | | | | 212.9 | |
| HX 3 | Portion 1 | | 2.2 | | | 2.2 | |
| | Portion 2 | | | | | 112.0 | |
| HX 4 (HGR) | | | 50.2 | | | | |
| HX 5 (SPR) | | | 93.3 | | | | |
| HX 6 | Portion 1 | | | | | 46.6 | |
| | Portion 2 | | | | | 8.7 | |
| HX 7 | | | 216.3 | | | | |
| HX 8 | | | 43.3 | | | | |
| Portion 1 of HX 2 | | | 78.8 | | | | |
| HX 9 (FTR) | | | | | | 45.9 | |
| HX 10 | | | | | | 11.8 | |
| HX G1 | | | | | | 165.0 | |
| HX G2 | | | | | | 21.8 | |
| HX G3 | | | | | | 68.4 | |
| Hydraulic Power | | | | | | | |
| Slurry Pump | | | | 0.3 | | | |
| Liquid State Water Turbine | | | | | | | 0.2 |

TABLE 1-continued

Biomass conversion optimized for production of Fischer-Tropsch Paraffins

| Component | Energy rate in (MW) | | | Energy rate out (MW) | | |
|---|---|---|---|---|---|---|
| | PCE | Heat | Work | PCE | Heat | Work |
| Brayton Cycle | | | | | | |
| Turbine 1 | | | | | | 7.9 |
| Turbine 2 | | | | | | 75.0 |
| Turbine 3 | | | | | | 0.0 |
| Air Compressor | | | 43.4 | | | |
| Rankine Cycle | | | | | | |
| Heat | | 290.0 | | | | |
| Mechanical Power | | | 0.5 | | | 103.5 |
| Waste Heat From Steam Cycle | | | | | 186.9 | |
| Chemical Conversion Process | | | | | | |
| synthetic paraffins produced | | | | 137 | | |
| synthetic diesel fuel produced* | | | | 116 | | |
| Input into Conversion Process | | | | | | |
| Biomass (waste wood) input PCE | 473.0 | | | | | |
| Overall Energy Balances | | | | | | |
| Total Energy | 473.0 | 827.3 | 44.1 | 137 | 1014.2 | 186.6 |
| Net Waste Heat Rejected | | | | | 186.9 | |
| Net Input Energy Required | | 0.0 | | | | |
| Power Conversion Process | | | | | | |
| Net Electricity Production | | | | | | 123.8 |
| Total Electricity Available for Export | | | | | | 123.8 |
| Overall Thermodynamic Conversion Efficiency | | | | | | 50.7% | notes
*synthetic paraffins produced are considered to be 50% cetane and 50% wax wax can be conventionally processed to produce cetane with 70% efficiency

TABLE 2

Biomass conversion optimized for production of dimethyl ether (DME)

| Component | | Energy rate in (MW) | | | Energy rate out (MW) | | |
|---|---|---|---|---|---|---|---|
| | | PCE | Heat | Work | PCE | Heat | Work |
| Heat Exchangers | | | | | | | |
| HX 1 | | | 53.4 | | | 53.4 | |
| HX 2 | Portion 1 | | | | | 54.5 | |
| | Portion 2 | | | | | 160.0 | |
| HX 3 | | | | | | 3.8 | |
| HX 4 (HGR) | | | 50.2 | | | | |
| HX 5 (SPR) | | | 91.3 | | | | |
| HX 6 | | | | | | 36.6 | |
| HX 7 | | | 152.8 | | | | |
| HX 8 | | | 29.9 | | | | |
| Portion 1 of HX 2 | | | 54.5 | | | | |
| HX 9 (DME-R) | | | | | | 32.3 | |
| HX 10 | | | | | | 0.7 | |
| HX 11 | | | | | | 1.6 | |
| HX 12 | | | | | | 3.2 | |
| HX G1 | | | | | | 150.2 | |
| HX G2 | | | | | | 21.3 | |
| HX G3 | | | | | | 66.8 | |
| HX G4 | Portion 1 (to HX 7) | | | | | 49.4 | |
| | Portion 2 (to HX 2) | | | | | 64.5 | |
| Hydraulic Power | | | | | | | |
| Slurry Pump | | | | 0.2 | | | |
| Liquid State Water Turbine | | | | | | | 0.1 |
| Brayton Cycles | | | | | | | |
| Turbine 2 | | | | | | | 3.4 |
| Turbine 3 | | | | | | | 4.0 |

TABLE 2-continued

Biomass conversion optimized for production of dimethyl ether (DME)

| Component | Energy rate in (MW) | | | Energy rate out (MW) | | |
|---|---|---|---|---|---|---|
| | PCE | Heat | Work | PCE | Heat | Work |
| Turbine 4 | | | | | | 70.7 |
| Compressor | | | 5.2 | | | |
| Air Compressor | | | 39.8 | | | |
| Rankine Cycle | | | | | | |
| Heat (HX 3, 9, 10, 11, 12 & G4) | | 266.1 | | | | |
| Mechanical Power | | | 0.4 | | | 95.0 |
| Waste Heat From Steam Cycle | | | | | 171.5 | |
| Chemical Conversion Process | | | | | | |
| dimethyl ether (DME) production | | | | 160.6 | | |
| Input into Conversion Process | | | | | | |
| Biomass (waste wood) input PCE | 473.0 | | | | | |
| Overall Energy Balances | | | | | | |
| Total Energy | 473.0 | 698.2 | 45.6 | 160.6 | 869.8 | 173.2 |
| Net Waste Heat Rejected | | | | | 171.5 | |
| Net Input Energy Required | | 0.0 | | | | |
| Power Conversion Process | | | | | | |
| Net Electicity Production | | | | | | 110.3 |
| Electricity Available for Export | | | | | | 110.3 |
| Overall Thermodynamic Conversion Efficiency | | | | | | 57.3% |

TABLE 3

Biomass conversion optimized for production of gaseous hydrogen fuel

| Component | | Energy rate in (MW) | | | Energy rate out (MW) | | |
|---|---|---|---|---|---|---|---|
| | | PCE | Heat | Work | PCE | Heat | Work |
| Heat Exchangers | | | | | | | |
| HX 1 | | | 53.4 | | | 53.4 | |
| HX 2 | Portion 1 | | | | | 54.5 | |
| | Portion 2 | | | | | 160.0 | |
| HX 3 | | | | | | 105.4 | |
| HX 4 (HGR) | | | 50.2 | | | | |
| HX 5 (SPR) | | | 91.3 | | | | |
| HX 6 | | | | | | 36.6 | |
| HX 7 | | | 152.8 | | | | |
| HX 8 | | | 29.9 | | | | |
| Portion 1 of HX 2 | | | 54.5 | | | | |
| HX G1 | | | | | | 151.0 | |
| HX G2 | | | | | | 20.5 | |
| HX G3 | Portion 1 (to HX 7) | | | | | 10.7 | |
| | Portion 2 (to HX 2) | | | | | 53.6 | |
| Hydraulic Power | | | | | | | |
| Slurry Pump | | | | 0.2 | | | |
| Liquid State Water Turbine | | | | | | | 0.1 |
| Brayton Cycle | | | | | | | |
| Turbine 1 | | | | | | | 6.7 |
| Turbine 2 | | | | | | | 57.3 |
| Air Compressor | | | | 29.4 | | | |
| Rankine Cycle | | | | | | | |
| Heat | | | 213.6 | | | | |
| Mechanical Power | | | | 0.4 | | | 76.3 |
| Waste Heat From Steam Cycle | | | | | | 137.7 | |
| Chemical Conversion Process | | | | | | | |
| Gaseous H2 fuel production | | | | | 221.4 | | |
| Input into Conversion Process | | | | | | | |
| Biomass (waste wood) input PCE | | 473.0 | | | | | |

TABLE 3-continued

Biomass conversion optimized for production of gaseous hydrogen fuel

| Component | Energy rate in (MW) | | | Energy rate out (MW) | | |
|---|---|---|---|---|---|---|
| | PCE | Heat | Work | PCE | Heat | Work |
| Overall Energy Balances | | | | | | |
| Total Energy | 473.0 | 645.8 | 29.9 | 221.4 | 783.5 | 140.4 |
| Net Waste Heat Rejected | | | | | 137.7 | |
| Net Input Energy Required | | 0.0 | | | | |
| Power Conversion Process | | | | | | |
| Net Electricity Production | | | | | | 96.4 |
| Total Electricity Available for Export | | | | | | 96.4 |
| Overall Thermodynamic Conversion Efficiency | | | | | | 67.2% |

TABLE 4

Biomass conversion optimized for production of electric power

| Component | Energy rate in (MW) | | | Energy rate out (MW) | | |
|---|---|---|---|---|---|---|
| | PCE | Heat | Work | PCE | Heat | Work |
| Heat Exchangers | | | | | | |
| HX 1 | | 53.4 | | | 53.4 | |
| HX 2    Portion 1 | | | | | 78.8 | |
|         Portion 2 | | | | | 212.9 | |
| HX 4 (HGR) | | 50.2 | | | | |
| HX 5 (SPR) | | 93.3 | | | | |
| HX 6 | | | | | 55.2 | |
| HX 7 | | 216.3 | | | | |
| HX 8 | | 43.3 | | | | |
| Portion 1 of HX 2 | | 78.8 | | | | |
| HX G1 | | | | | 243.2 | |
| HX G2    Portion 1 | | | | | 73.0 | |
|          Portion 2 (for Steam Turbine 2) | | | | | 70.3 | |
| HX G3    Portion 1 (to HX 2) | | | | | 77.1 | |
|          Portion 2 (to HX 7) | | | | | 88.0 | |
| HX G4 (from cold side of HX G1) | | 56.4 | | | 56.4 | |
| Hydraulic Power | | | | | | |
| Liquid Pump | | | 0.3 | | | |
| Liquid State Turbine | | | | | | 0.2 |
| Rankine cycle #1 | | | | | | |
| HX 2 (portion 2) | | 212.9 | | | | |
| HX G3 | | 77.1 | | | | |
| Mechanical Power | | | 0.5 | | | 103.5 |
| Waste Heat From Steam Cycle | | | | | 186.9 | |
| CPE of syntheisis gas fuel | | | | 596.8 | | |
| Brayton Cycle #1 | | | | | | |
| Turbine 1 | | | | | | 7.9 |
| Air Compressor | | | 64.6 | | | |
| Combined Cycles | | | | | | |
| Gas Cycle | | | | | | |
| Turbine 2 | | | | | | 109.3 |
| Steam Cycle 2 | | | | | | |
| HX G2 | | 70.3 | | | | |
| HX G4 | | 56.4 | | | | |
| Mechanical Power | | | 0.2 | | | 45.3 |
| Waste Heat From Steam Cycle | | | | | 81.7 | |
| Input into Conversion Process | | | | | | |
| Biomass (waste wood) input PCE | 473.0 | | | | | |
| Overall Energy Balances | | | | | | |
| Total Energy | 473.0 | 1008.3 | 65.5 | 596.8 | 1276.9 | 266.2 |
| Net Waste Heat Rejected | | | | | 268.6 | |
| Net Input Energy Required | | 0.0 | | | | |

TABLE 4-continued

Biomass conversion optimized for production of electric power

| Component | Energy rate in (MW) | | | Energy rate out (MW) | | |
|---|---|---|---|---|---|---|
| | PCE | Heat | Work | PCE | Heat | Work |
| Power Conversion Process | | | | | | |
| Net Electricity Production | | | | | | 180.6 |
| Total Electricity Available for Export | | | | | | 180.6 |
| Overall Thermodynamic Conversion Efficiency | | | | | | 38.2% |

TABLE 5

Biomass conversion optimized for production of Fischer-Tropsch Paraffins with increased input water:biomass ratio = 9:1 and adiabatic HGR (AHGR)

| Component | | Energy rate in (MW) | | | Energy rate out (MW) | | |
|---|---|---|---|---|---|---|---|
| | | PCE | Heat | Work | PCE | Heat | Work |
| Heat Exchangers | | | | | | | |
| HX 1 | | | 22.8 | | | 22.8 | |
| HX 2 | Portion 1 | | | | | 49.0 | |
| | Portion 2 | | | | | 151.1 | |
| HX 3 | Portion 1 | | | | | 56.4 | |
| | Portion 2 | | | | | 24.8 | |
| HX 4 | | | 23.6 | | | 23.6 | |
| HX 5 (SPR) | | | 129.8 | | | | |
| HX 6 | | | 32.8 | | | 32.8 | |
| HX 7 | | | 603.4 | | | 481.8 | |
| HX 8 | | | 15.9 | | | | |
| Portion 1 of HX 2 | | | 49.0 | | | | |
| HX 9 (FTR) | | | | | | 37.4 | |
| | | | | | | 37.3 | |
| HX 10 | | | | | | 17.3 | |
| HX G1 | | | | | | 122.0 | |
| HX G2 | | | | | | 23.7 | |
| HX G3 | Portion 1 | | 18.8 | | | 18.8 | |
| | Portion 2 | | | | | 8.0 | |
| Hydraulic Power | | | | | | | |
| Liquid Pump | | | | 0.6 | | | |
| Turbine 1 | | | | | | | 7.3 |
| Turbine 2 | | | | | | | 54.9 |
| Turbine 3 | | | | | | | 0.0 |
| Brayton Cycle | | | | | | | |
| Turbine 4 | | | 20.5 | | | | 20.5 |
| Turbine 5 | | | 103.5 | | | | 103.5 |
| Turbine 6 | | | 1.0 | | | | 1.0 |
| Compressor | | | | 2.8 | | | |
| Air Compressor | | | | 31.2 | | | |
| Condenser Heat | | | 85.8 | | | | |
| Turbine 7 & 8 | | | | 0.1 | | | 23.6 |
| Waste Heat From Steam Cycle | | | | | | 62.2 | |
| Chemical Conversion Process | | | | | | | |
| synthetic paraffins produced | | | | | 214.9 | | |
| synthetic diesel fuel produced* | | | | | | | |
| Input into Conversion Process | | | | | | | |
| Biomass (waste wood) input PCE | | 473.0 | | | | | |
| Overall Energy Balances | | | | | | | |
| Total Energy | | 473.0 | 1106.9 | 34.7 | 214.9 | 1169.2 | 210.8 |
| Net Waste Heat Rejected | | | | | | 62.2 | |
| Net Input Energy Required | | | 0.0 | | | | |

TABLE 5-continued

Biomass conversion optimized for production of Fischer-Tropsch Paraffins with increased input water:biomass ratio = 9:1 and adiabatic HGR (AHGR)

| Component | Energy rate in (MW) | | | Energy rate out (MW) | | |
|---|---|---|---|---|---|---|
| | PCE | Heat | Work | PCE | Heat | Work |
| Power Conversion Process | | | | | | |
| Net Electricity Production | | | | | | 155.1 |
| Total Electricity Available for Export | | | | | | |
| ḟerall Thermodynamic Conversion Efficiency | | | | | | | notes
*synthetic paraffins produced are considered to be 50% cetane and 50% wax wax can be conventionally processed to produce cetane with 70% efficiency

TABLE 6

Summary of Optimized Performance Studies for Biomass Conversion Options*

| Feed stock | feed rate kg/hr | MT/day | water/ biomass ratio | useful production per day | CPE rate MW ch | percent CPE input | | |
|---|---|---|---|---|---|---|---|---|
| Dry waste wood | 83775 | 2011 | | | 473.0 | 100.0% | | |
| | | | Conversion Options | | | | | |
| 1 Fischer-Tropsch Liquids (FTL) | | | | bbl/day | | | bbl/ton | |
| water fed used | 264670 | 6352 | 3.2 | | | | | MW h/ton |
| synthetic diesel fuel | 11526 | 277 | | 2231 | 116.0 | 24.5% | 1.11 | |
| electricity exported | | | | | 123.8 | 26.2% | | 1.48 |
| process water recovered | 295523 | 7093 | | | | | | |
| excess water available | 30853 | 740 | | | | | | |
| Air supply for combustion | 456047 | 10945 | | | | | | |
| CO2 produced | 122356 | 2937 | | | | | | |
| rejected waste heat | | | | | 187.0 | 39.5% | | |
| | | | | overall energy utilization | | 50.7% | | |
| 2 Dimethyl ether (DME) | | | | bbl/day # | | | bbl/ton | |
| water fed needed | 184387 | 4425 | 2.2 | | | | | MW h/ton |
| dimethyl ether produced | 20045 | 481 | | 4530 | 160.6 | 33.9% | 2.25 | |
| electricity exported | | | | | 110.3 | 23.3% | | 1.32 |
| process water recovered | 207334 | 4976 | | | | | | |
| excess water produced | 22947 | 551 | | | | | | |
| Air supply for combustion | 410739 | 9858 | | | | | | |
| CO2 produced | 119899 | 2878 | | | | | | |
| rejected waste heat | | | | | 171.5 | 36.3% | | |
| | | | | overall energy utilization | | 57.3% | | |
| 3 Gaseous Hydrogen (GH2) | | | | cu m/day+ | | | cu m/ton | |
| water fed needed | 184387 | 4425 | 2.2 | | | | | MW h/ton |
| gaseous hydrogen (GH2) | 5618 | 135 | | 1899 | 221.4 | 46.8% | 0.94 | |
| electricity exported | | | | | 96.4 | 20.4% | | 1.15 |
| water produced | 180601 | 4334 | | | | | | |
| excess water produced | −3785 | −91 | | | | | | |
| Air supply for combustion | 429682 | 10312 | | | | | | |
| CO2 produced | 158173 | 3796 | | | | | | |
| rejected waste heat | | | | | 137.7 | 29.1% | | |
| | | | | overall energy utilization | | 67.2% | | |
| 4 All Electric Power (AEP) | | | | MW eh/day | | | MW h/ton | |
| water fed needed | 260393 | 6249 | 3.1 | | | | | |
| electricity exported | | | | 4335 | 180.6 | 38.2% | 2.16 | |
| water produced | 311110 | 7467 | | | | | | |
| excess water produced | 50717 | 1217 | | | | | | |
| Air supply for combustion | 878774 | 16291 | | | | | | |
| CO2 produced | 158144 | 3795 | | | | | | |
| rejected waste heat | | | | | 230.0 | 48.8% | | |
| | | | | overall energy utilization | | 38.2% | | |
| 5 FTL with water:biomass at 9:1 and adaiabatic HGR (AHGR) | | | | bbl/day | | | bbl/ton | |
| water fed used | 753975 | 18095 | 9.0 | | | | | MW h/ton |
| synthetic diesel fuel | 18147 | 436 | | 3512 | 182.7 | 38.6% | 1.75 | |
| electricity exported | | | | | 155.1 | 32.8% | | 1.85 |
| process water recovered | 775890 | 18621 | | | | | | |
| excess water available | 21915 | 526 | | | | | | |
| Air supply for combustion | 456047 | 10945 | | | | | | |

TABLE 6-continued

Summary of Optimized Performance Studies for Biomass Conversion Options*

| Feed stock | feed rate kg/hr | MT/day | water/ biomass ratio | useful production per day | CPE rate MW ch | percent CPE input |
|---|---|---|---|---|---|---|
| $CO_2$ produced | 122356 | 2937 | | | | |
| rejected waste heat | | | | | 62.2 | 13.2% |
| | | | | overall energy utilization | | 71.4% |
| | | | | | revision | Oct. 12, 2001 |

Notes
No additional energy or energetic feedstock is requierd for all conversion options
All rejected waste heat is at a temperature below 40 C. and is not considered recoverable
DME stored as a compressed liquid at 20 C., 5.1 atm. pressure, density 668 g/L and LHV 28.4 MJ/kg

TABLE 7

Summary of Optimized Performance Parameters for Biomass Conversion Options*

| Feed stock | feed rate kg/hr | MT/day | water/ biomass ratio | useful production per day | CPE rate MW ch | — | percent CPE input |
|---|---|---|---|---|---|---|---|
| Dry waste wood | 83775 | 2011 | | | 473.0 | | 100.0% |
| | | | Conversion Options | | | | |
| 1 Fischer-Tropsch Liquids (FTL) | | | | bbl/day | | | |
| water fed used | 264670 | 6352 | 3.2 | | | | |
| synthetic diesel fuel | 11526 | 277 | | 2231 | 116.0 | | 24.5% |
| electricity exported | | | | | 123.8 | | 26.2% |
| process water recovered | 295523 | 7093 | | | | | |

| Input conditions: | T deg. C. | P atm. | H2/C | H2O/C | CO/H2 | CH4/CO | |
|---|---|---|---|---|---|---|---|
| HGR | 1000 | 30 | 3.48 | 0.07 | | | |
| SPR | 1000 | 30 | 2.47 | 4.15 | 0.21 | 0.93 | |
| synthesis reactor | 200 | 10 | 1.4 | | 0.47 | 0.03 | |
| | | | | overall energy utilization | | | 50.7% |
| 2 Dimethyl ether (DME) | | | | bbl/day # | | | |
| water fed needed | 184387 | 4425 | 2.2 | | | | |
| dimethyl ether produced | 20045 | 481 | | 4530 | 160.6 | | 33.9% |
| electricity exported | | | | | 110.3 | | 23.3% |
| process water recovered | 207334 | 4976 | | | | | |

| Input conditions: | T deg. C. | P atm. | H2/C | H2O/C | CO/H2 | CH4/CO | |
|---|---|---|---|---|---|---|---|
| HGR | 1000 | 30 | 3.48 | 0.07 | | | |
| SPR | 1000 | 30 | 2.47 | 2.91 | 0.21 | 0.93 | |
| synthesis reactor | 260 | 70 | 1.2 | | 0.58 | 0.05 | |
| | | | | overall energy utilization | | | 57.3% |
| 3 Gaseous Hydrogen (GH2) | | | | cu m/day+ | | | |
| water fed needed | 184387 | 4425 | 2.2 | | | | |
| gaseous hydrogen (GH2) | 5618 | 135 | | 1899 | 221.4 | | 46.8% |
| electricity exported | | | | | 96.4 | | 20.4% |
| water produced | 180601 | 4334 | | | | | |

| Input conditions: | T deg. C. | P atm. | H2/C | H2O/C | CO/H2 | CH4/CO | |
|---|---|---|---|---|---|---|---|
| HGR | 1000 | 30 | 3.48 | 0.07 | | | |
| SPR | 1000 | 30 | 2.47 | 2.91 | 0.21 | 0.93 | |
| | | | | overall energy utilization | | | 67.2% |
| 4 All Electric Power (AEP) | | | | MW eh/day | | | |
| water fed needed | 260393 | 6249 | 3.1 | | | | |
| electricity exported | | | | 4335 | 180.6 | | 38.2% |
| water produced | 311110 | 7467 | | | | | |

| Input conditions: | T deg. C. | P atm. | H2/C | H2O/C | CO/H2 | CH4/CO | |
|---|---|---|---|---|---|---|---|
| HGR | 1000 | 30 | 3.48 | 0.07 | | | |
| SPR | 1000 | 30 | 2.47 | 4.15 | 0.21 | 0.93 | |

TABLE 7-continued

Summary of Optimized Performance Parameters for Biomass Conversion Options*

| | | | overall energy utilization | | | 38.2% |
|---|---|---|---|---|---|---|
| 5 FTL with water:biomass at 9:1 and adiabatic HGR (AHGR) | | | bbl/day | | | |
| water fed used | 753975 | 18095 | 9.0 | | | |
| synthetic diesel fuel | 18147 | 436 | 3512 | 182.7 | | 38.6% |
| electricity exported | | | | 155.1 | | 32.8% |
| process water recovered | 775890 | 18621 | | | | |

| Input conditions: | T deg. C. | P atm. | H2/C | H2O/C | CO/H2 | CH4/CO |
|---|---|---|---|---|---|---|
| adiabatic HGR | 738 | 30 | 1.67 | 0.43 | | |
| SPR | 900 | 30 | 0.84 | 3.08 | 0.18 | 4.47 |
| synthesis reactor | 200 | 10 | 1.38 | | 0.47 | 0.17 |

| | | overall energy utilization | 71.4% |
|---|---|---|---|
| | | revision | Oct. 9, 2001 |

Notes
No additional energy or energetic feedstock is requierd for all conversion options
All rejected waste heat is at a temperature below 40 C. and is not considered recoverable
DME stored as a compressed liquid at 20 C., 5.1 atm. pressure, density 668 g/L and LHV 28.4 MJ/kg 1 bbl of compressed liquid DME has a mass of 106.2 kg and LHV CPE of 3.02 GJ
+ Cubic meters of liquified hydrogen (at 20 deg K) per day at 1 atm. pressure Approximately 3.7 MJ/kg is needed to cool and liquify hydrogen having an HHV of 144 MJ/kg
*All thermochemical and thermodynamic simulation data as of Oct. 1, 2001

What is claimed is:

1. A process for producing a synthesis gas for use as a gaseous fuel or as feed into Fischer-Tropsch reactor to produce a liquid fuel, the improvement comprising:
    forming a liquid suspension slurry of particles of carbonaceous material in water;
    feeding said suspension slurry and hydrogen from an internal source into a hydro-gasification reactor under conditions of super-atmospheric pressure without a reaction catalyst and at a temperature under said pressure whereby methane rich producer gases are generated;
    feeding the methane rich producer gases from the hydro-gasification reactor into a steam pyrolytic reformer under conditions whereby synthesis gas comprising hydrogen end carbon monoxide are generated;
    feeding a portion of the hydrogen generated by the steam pyrolytic reformer into the hydro-gasification reactor as said hydrogen from an internal source; and
    either utilizing said synthesis gas generated by the steam pyrolytic reformer for process heat or as fuel for an engine to produce electricity, or feeding said synthesis gas into the Fischer-Tropsch type reactor under conditions whereby a liquid fuel is produced.

2. The process of claim 1 wherein said portion of the hydrogen generated by the steam pyrolytic reformer is obtained through a hydrogen purification filter.

3. The process of claim 1 wherein said conditions and the relative amounts of said carbonaceous material, hydrogen and water in the hydro-gasification reactor are such that said methane rich producer gases are produced exothermally.

4. The process of claim 1 in which said liquid slurry of carbonaceous material is formed by grinding said carbonaceous material in water.

5. The process of claim 1 in which said liquid slurry of carbonaceous material is heated with superheated steam from a steam generator prior to being fed into the hydro-gasification reactor.

6. The process of claim 5 in which the superheated steam is separated from the slurry, prior to feeding the slurry into the hydro-gasification reactor, and is fed into the steam pyrolytic reformer to react with the methane rich producer gases from the hydro-gasification reactor.

7. The process of claim 5 in which the slurry, together with the superheated steam, is fed into the hydro-gasification reactor.

8. The process of claim 7 in which synthesis gas generated by the steam pyrolytic reformer is fed into a Fischer-Tropsch reactor under conditions whereby a liquid fuel is produced.

9. The process of claim 8 wherein said conditions and the relative amounts of hydrogen and carbon monoxide in the Fischer-Tropsch reactor are such that said liquid fuel is produced exothermally.

10. The process of claim 9 comprising transferring exothermic heat from one or both of the hydro-gasification reactor and Fischer-Tropsch reactor to one or both of the steam generator and the steam pyrolytic reformer.

11. The process of claim 9 comprising transferring exothermic heat from the hydro-gasification reactor and Fischer-Tropsch reactor to the steam generator and the steam pyrolytic reformer.

12. The process of claim 11 in which molten salt loops are used to transfer said exothermic heat.

13. The process of claim 1 in which said carbonaceous material comprises biomass.

14. The process of claim 13 in which said biomass comprises municipal solid waste.

15. The process of claim 8 in which the relative amounts of hydrogen and carbon monoxide in the synthesis gas fed into the Fischer-Tropsch reactor are such that said liquid fuel is substantially cetane.

16. A substantially self-sustaining process for producing a liquid fuel from carbonaceous feed, comprising:
    grinding said carbonaceous material in water to form a suspension slurry of carbonaceous particles;
    heating the slurry with superheated steam from a steam generator;
    feeding hydrogen from an internal source, the suspension slurry, and the superheated steam into a hydro-gasification reactor under conditions of a pressure of about 20 to 50 atmospheres without a reaction catalyst and at a temperature in the range of about 700 to 1200 degrees Celsius, and in amounts whereby methane rich producer gases are generated exothermally;

feeding the methane rich producer gases from the hydro-gasification reactor and said superheated steam into a steam pyrolytic reformer under conditions whereby synthesis gas comprising hydrogen and carbon monoxide are generated;

feeding a portion of the hydrogen generated by the steam pyrolytic reformer, obtained through a hydrogen purification filter, into the hydro-gasification reactor, the hydrogen therefrom constituting said hydrogen from an internal source;

feeding the remainder of the synthesis gas generated by the steam pyrolytic reformer into the Fischer-Tropsch reactor under conditions whereby a liquid fuel is produced exothermally; and transferring exothermic heat from the hydro-gasification reactor and Fischer-Tropsch reactor to the steam generator and the steam pyrolytic reformer, whereby said process is substantially self-sustaining.

17. The process of claim 16 in which molten salt loops are used to transfer said exothermic heat.

18. The process of claim 16 in which said carbonaceous material comprises biomass.

19. The process of claim 16 in which said biomass comprises municipal solid waste.

* * * * *